US011783332B2

(12) United States Patent
Madan et al.

(10) Patent No.: US 11,783,332 B2
(45) Date of Patent: Oct. 10, 2023

(54) METHOD AND SYSTEM FOR FACILITATING SECURE CARD-BASED TRANSACTIONS

(71) Applicant: Mastercard International Incorporated, New York, NY (US)

(72) Inventors: Amisha Madan, New Delhi (IN); Saugandh Datta, Greater Noida (IN); Deepak Agarwal, Gurgaon (IN)

(73) Assignee: MASTERCARD INTERNATIONAL INCORPORATED, New York, NY (US)

( * ) Notice: Subject to any disclaimer, the term of this patent is extended or adjusted under 35 U.S.C. 154(b) by 0 days.

(21) Appl. No.: 17/175,023

(22) Filed: Feb. 12, 2021

(65) Prior Publication Data

US 2021/0256517 A1 Aug. 19, 2021

(30) Foreign Application Priority Data

Feb. 14, 2020 (IN) .............................. 202021006528

(51) Int. Cl.
*G06Q 20/00* (2012.01)
*G06Q 20/40* (2012.01)
(Continued)

(52) U.S. Cl.
CPC ....... *G06Q 20/401* (2013.01); *G06F 16/9035* (2019.01); *G06Q 20/34* (2013.01)

(58) Field of Classification Search
CPC ...... G06Q 20/40; G06Q 20/34; G06Q 20/401; G06F 16/9035

(Continued)

(56) References Cited

U.S. PATENT DOCUMENTS 5,956,699 A * 9/1999 Wong ................... G06Q 20/065
340/5.4
6,577,714 B1 6/2003 Darcie et al.
(Continued)

FOREIGN PATENT DOCUMENTS

| EP | 3364363 A1 | 8/2018 |
|---|---|---|
| WO | 2013-155627 A1 | 10/2013 |
| WO | 2015-160385 A1 | 10/2015 |

OTHER PUBLICATIONS

Card-Present Transactions on the Internet Using the Smart Card Web Server IEEE 2013 (Year: 2013).*

(Continued)

*Primary Examiner* — Bruce I Ebersman
(74) *Attorney, Agent, or Firm* — Pramudji Law Group PLLC; Ari Pramudji

(57) ABSTRACT

A method and a system for facilitating secure card-based transactions are provided. A payment network server stores a mapping database that is indicative of a mapping between actual card data of a transaction card and a plurality of proxy datasets that are stored in the transaction card. The payment network server receives a transaction request for a transaction that is initiated by way of the transaction card. Instead of the actual card data, the transaction request includes a first proxy dataset as an identifier to the transaction card. The payment network server accesses the mapping database and retrieves the actual card data mapped to the first proxy dataset. The payment network server then communicates the transaction request having the actual card data to an issuer of the transaction card. The issuer processes the transaction based on the actual card data.

14 Claims, 12 Drawing Sheets

(51) Int. Cl.
*G06F 16/9035* (2019.01)
*G06Q 20/34* (2012.01)

(58) Field of Classification Search
USPC .......................................................... 705/44
See application file for complete search history.

(56) References Cited

U.S. PATENT DOCUMENTS

| | | | |
|---|---|---|---|
| 7,539,619 | B1 | 5/2009 | Seligman et al. |
| 7,584,153 | B2 | 9/2009 | Brown et al. |
| 8,566,168 | B1 | 10/2013 | Bierbaum et al. |
| 8,731,975 | B2* | 5/2014 | English ............... H04L 61/5007 705/40 |
| 8,930,274 | B1* | 1/2015 | Brickell ................. G06Q 20/40 705/67 |
| 9,818,104 | B1 | 11/2017 | Katzer et al. |
| 2002/0035548 | A1 | 3/2002 | Hogan et al. |
| 2004/0050928 | A1 | 3/2004 | Bishop et al. |
| 2004/0193603 | A1 | 9/2004 | Ljubicich |
| 2005/0171898 | A1* | 8/2005 | Bishop ................. G06Q 20/327 705/39 |
| 2006/0149671 | A1 | 7/2006 | Nix et al. |
| 2006/0178986 | A1 | 8/2006 | Giordano et al. |
| 2006/0237528 | A1* | 10/2006 | Bishop ............... G06Q 20/3572 235/380 |
| 2007/0052517 | A1* | 3/2007 | Bishop ................. G06Q 20/385 340/5.2 |
| 2007/0192245 | A1* | 8/2007 | Fisher .................. G06Q 20/401 705/39 |
| 2009/0048968 | A1 | 2/2009 | Bishop et al. |
| 2010/0258620 | A1 | 10/2010 | Torreyson et al. |
| 2011/0010293 | A1 | 1/2011 | Giordano et al. |
| 2011/0251962 | A1* | 10/2011 | Hruska .............. G06Q 20/4012 705/72 |
| 2012/0028609 | A1* | 2/2012 | Hruska ................. H04W 12/02 455/411 |
| 2012/0179558 | A1 | 7/2012 | Fischer |
| 2013/0054454 | A1 | 2/2013 | Purves et al. |
| 2013/0097146 | A1 | 4/2013 | Lanphear et al. |
| 2013/0159552 | A1 | 6/2013 | Xiang et al. |
| 2013/0246202 | A1* | 9/2013 | Tobin ................... G06Q 20/326 705/18 |
| 2013/0246267 | A1* | 9/2013 | Tobin ................... G06Q 20/229 705/44 |
| 2013/0262315 | A1* | 10/2013 | Hruska .............. G06Q 20/3276 705/67 |
| 2013/0282502 | A1* | 10/2013 | Jooste ................... G06Q 20/40 705/44 |
| 2014/0019336 | A1 | 1/2014 | Browne et al. |
| 2014/0214616 | A1 | 7/2014 | Major et al. |
| 2014/0291406 | A1 | 10/2014 | Ko |
| 2014/0351146 | A1 | 11/2014 | Johnson et al. |
| 2014/0164254 | A1 | 12/2014 | Dimmick |
| 2014/0365363 | A1 | 12/2014 | Knudsen et al. |
| 2014/0372308 | A1 | 12/2014 | Sheets |
| 2015/0019577 | A1 | 1/2015 | Bouvigne et al. |
| 2015/0046340 | A1 | 2/2015 | Dimmick |
| 2015/0095225 | A1 | 4/2015 | Appana et al. |
| 2015/0120472 | A1 | 4/2015 | Aabye et al. |
| 2015/0154588 | A1 | 6/2015 | Purves et al. |
| 2015/0220914 | A1 | 8/2015 | Purves et al. |
| 2015/0227920 | A1 | 8/2015 | Sadiq et al. |
| 2015/0230045 | A1 | 8/2015 | Johnson et al. |
| 2015/0347549 | A1 | 12/2015 | Chang et al. |
| 2016/0063486 | A1 | 3/2016 | Purves et al. |
| 2016/0140535 | A1 | 5/2016 | Noe et al. |
| 2016/0148197 | A1 | 5/2016 | Dimmick |
| 2016/0162889 | A1 | 6/2016 | Badenhorst |
| 2016/0260096 | A1 | 9/2016 | Lacoss-Arnold et al. |
| 2017/0017958 | A1 | 1/2017 | Scott et al. |
| 2017/0372301 | A1 | 12/2017 | Theurer et al. |
| 2018/0006821 | A1 | 1/2018 | Kinagi |
| 2018/0232734 | A1 | 8/2018 | Smets et al. |
| 2018/0253727 | A1 | 9/2018 | Ortiz et al. |
| 2019/0020478 | A1 | 1/2019 | Girish et al. |
| 2019/0095908 | A1 | 3/2019 | Lacoss-Arnold et al. |
| 2019/0108508 | A1 | 4/2019 | Parento et al. |
| 2019/0385160 | A1 | 12/2019 | Safak et al. |
| 2020/0160323 | A1 | 5/2020 | Ledwell et al. |
| 2021/0042726 | A1 | 2/2021 | Purves et al. |
| 2021/0272101 | A1 | 9/2021 | Kalgi |
| 2022/0020016 | A1 | 1/2022 | Scott et al. |
| 2022/0253832 | A1 | 8/2022 | Hammad et al. |
| 2022/0270078 | A1 | 8/2022 | Pomeroy et al. |

OTHER PUBLICATIONS

Secure and Fraud Proof Online Payment System for Credit Cards IEEE 2021 (Year: 2021).*

Evolution of Prepaid Payment Processor's Software Architecture: An Empirical Study IEEE 2012 (Year: 2012).*

PCT International Search Report and Written Opinion (and English translation); PCT/US2021/033124; dated Jul. 22, 2021.

* cited by examiner

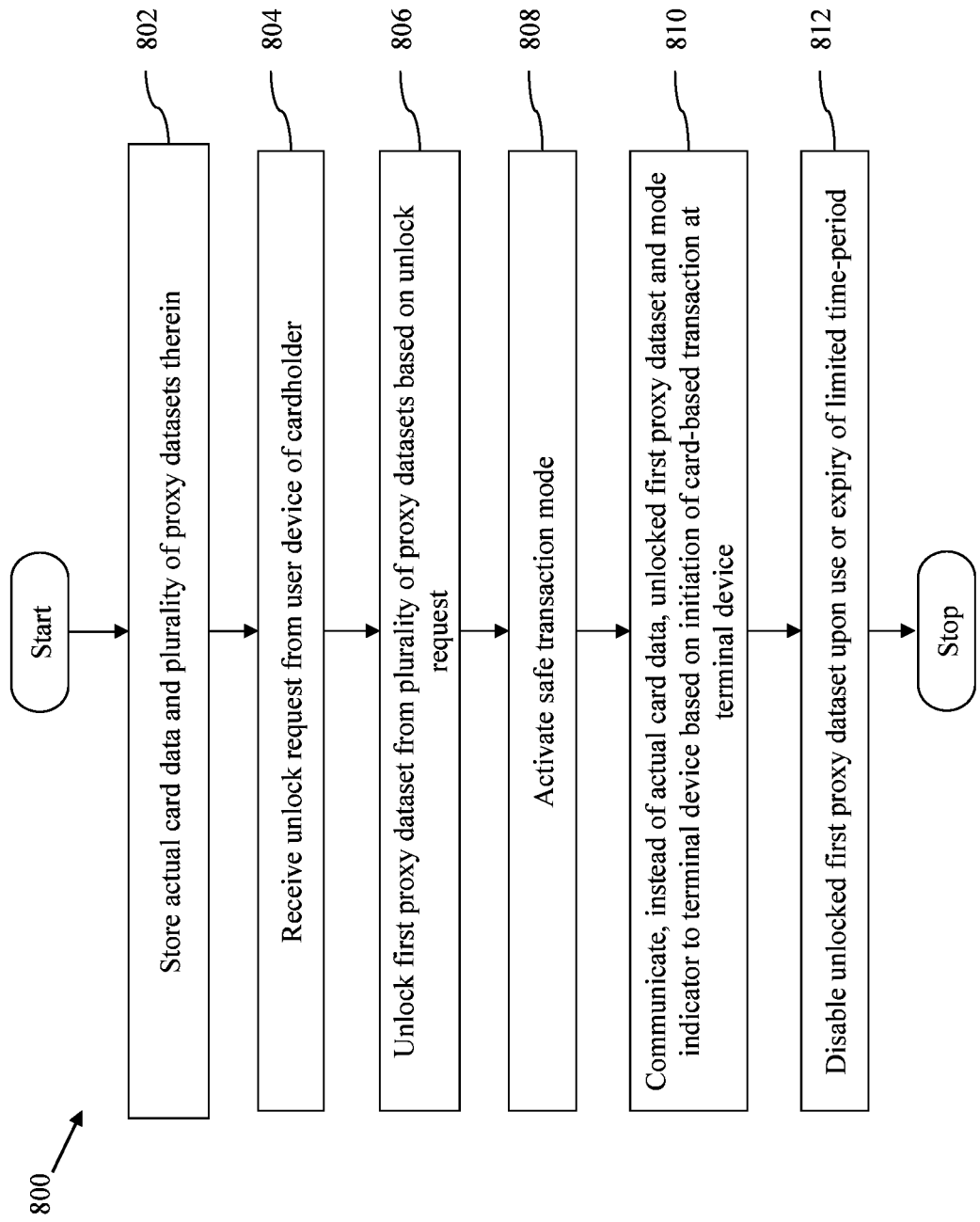

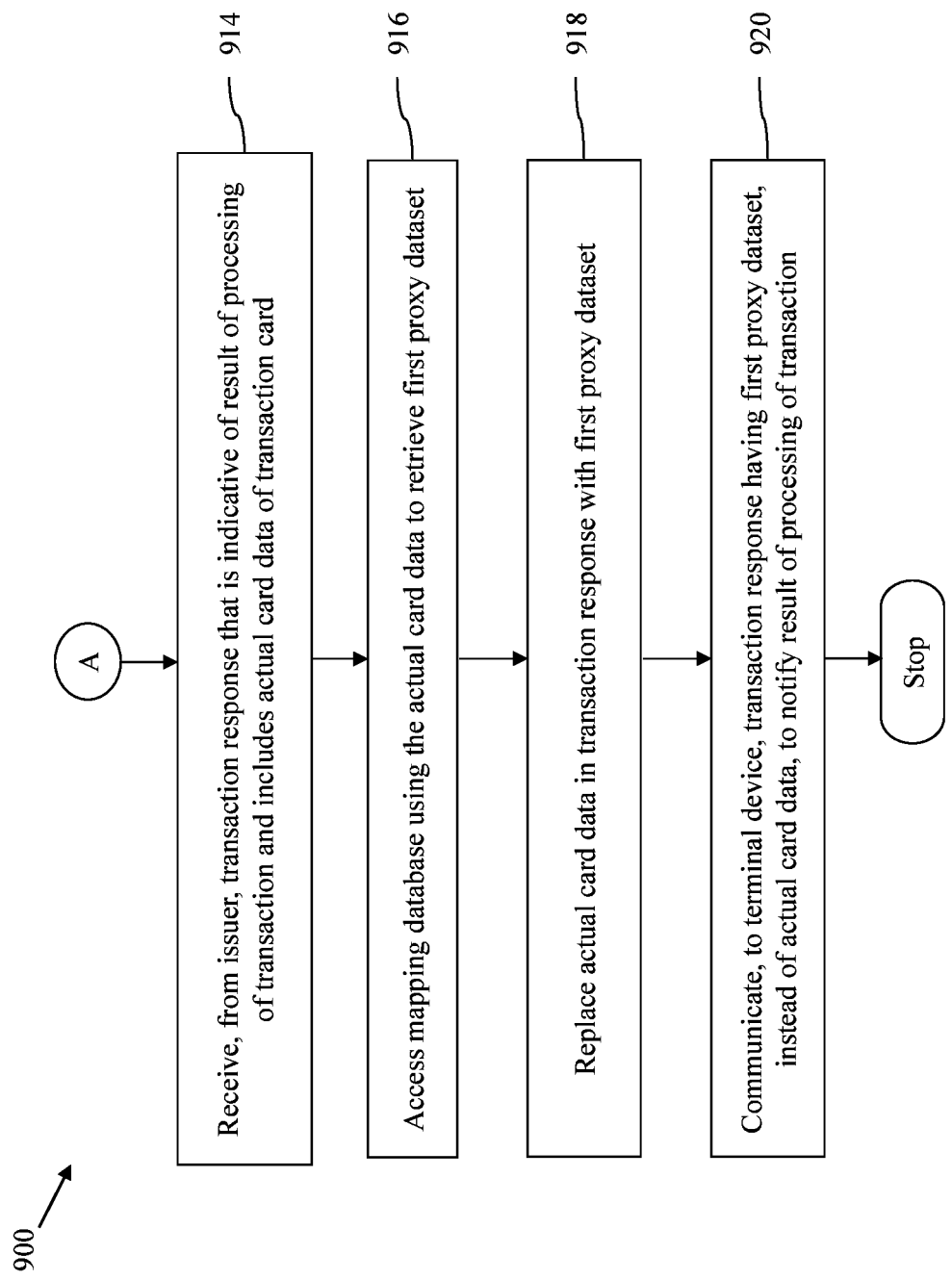

METHOD AND SYSTEM FOR FACILITATING SECURE CARD-BASED TRANSACTIONS

BACKGROUND

Field of the Disclosure

Various embodiments of the disclosure relate generally to transaction processing systems. More specifically, various embodiments of the disclosure relate to a method and a system for facilitating secure card-based transactions.

Description of the Related Art

Introduction of transaction cards, such as credit cards and debit cards, has increased the ease with which users perform payment transactions. For every transaction card, card data including a transaction card number, an expiry date, and a card verification value is unique. Typically, such card data of a transaction card is recorded in a magnetic stripe or a Europay, Mastercard and Visa (EMV) chip of the transaction card. When the transaction card is used at a terminal device (e.g., a point-of-sale device) to initiate a card-based transaction, the card data of the transaction card is communicated to the terminal device. The terminal device then communicates the card data to an issuer of the transaction card over an acquirer and payment network channel for processing the card-based transaction. Thus, the card data of the transaction card is exposed to the terminal device and a merchant associated with the terminal device.

Exposure of the card data to the merchant presents a potential risk of fraudulent use of the transaction card at merchant level. For mitigating the risk of exposing the card data to unreliable merchants, the user typically opts for cash-based transactions at such merchants. Thus, when the user wants to make a purchase at such a merchant, the user is required to carry sufficient cash to make the purchase. In a scenario where the user is carrying insufficient cash, the user can either delay the purchase or use the transaction card and risk exposing the card data to the merchant. However, in some scenarios, delaying the purchase may not be a viable solution, thus, forcing the user to use the transaction card. Once the card data is compromised, the user is required to block the compromised transaction card for preventing fraudulent use and request the issuer for a new transaction card. However, procuring the new transaction card may sometimes take weeks, causing unnecessary inconvenience to the user.

In light of the foregoing, there exists a need for a solution that solves the abovementioned problems and helps in safeguarding card data of a transaction card during card-based transactions.

SUMMARY

In an embodiment of the disclosure, a method for facilitating secure card-based transactions is provided. A mapping database is stored by a payment network server therein. The mapping database is indicative of a mapping between actual card data of a transaction card and a plurality of proxy datasets that are stored in a memory of the transaction card. A transaction request is received by the payment network server for a transaction that is initiated at a terminal device by way of the transaction card. The transaction request includes, instead of the actual card data, a first proxy dataset of the plurality of proxy datasets as an identifier to the transaction card. The mapping database is accessed by the payment network server using the first proxy dataset to retrieve the actual card data of the transaction card. The transaction request having the actual card data is then communicated by the payment network server to an issuer of the transaction card for processing the transaction. The transaction is processed by the issuer based on the actual card data.

In another embodiment of the disclosure, a system for facilitating secure card-based transactions is provided. The system includes a payment network server that includes a first memory and processing circuitry. The first memory is configured to store a mapping database that is indicative of a mapping between actual card data of a transaction card and a plurality of proxy datasets that are stored in a second memory of the transaction card. The processing circuitry is configured to receive a transaction request for a transaction initiated at a terminal device by way of the transaction card. The transaction request includes, instead of the actual card data, a first proxy dataset of the plurality of proxy datasets as an identifier to the transaction card. The processing circuitry is further configured to access the mapping database stored in the first memory using the first proxy dataset to retrieve the actual card data of the transaction card. The processing circuitry is further configured to communicate the transaction request having the actual card data to an issuer of the transaction card for processing the transaction. The transaction is processed by the issuer based on the actual card data.

In another embodiment of the disclosure, a transaction card for facilitating secure card-based transactions is provided. The transaction card includes a memory and processing circuitry. The memory is configured to store actual card data and a plurality of proxy datasets of the transaction card. The processing circuitry is configured to receive an unlock request from a user device of a user of the transaction card and unlock a first proxy dataset from the plurality of proxy datasets based on the unlock request. The processing circuitry is further configured to communicate, instead of the actual card data, the unlocked first proxy dataset to a terminal device based on an initiation of a transaction at the terminal device by way of the transaction card. The unlocked first proxy dataset is included as an identifier to the transaction card in a transaction request for the transaction. At a payment network server, the actual card data of the transaction card is retrieved based on the first proxy dataset and the transaction request having the actual card data is communicated to an issuer of the transaction card for processing the transaction.

BRIEF DESCRIPTION OF DRAWINGS

The accompanying drawings illustrate the various embodiments of systems, methods, and other aspects of the disclosure. It will be apparent to a person skilled in the art that the illustrated element boundaries (e.g., boxes, groups of boxes, or other shapes) in the figures represent one example of the boundaries. In some examples, one element may be designed as multiple elements, or multiple elements may be designed as one element. In some examples, an element shown as an internal component of one element may be implemented as an external component in another, and vice versa.

Various embodiments of the disclosure are illustrated by way of example, and not limited by the appended figures, in which like references indicate similar elements:

FIG. 8 is a flow chart that illustrates a method for activating a safe transaction mode of the transaction card, in accordance with an exemplary embodiment of the disclosure;

FIGS. 9A and 9B, collectively represent a flow chart that illustrates a method for facilitating secure card-based transactions, in accordance with an exemplary embodiment of the disclosure.

Figure 1:
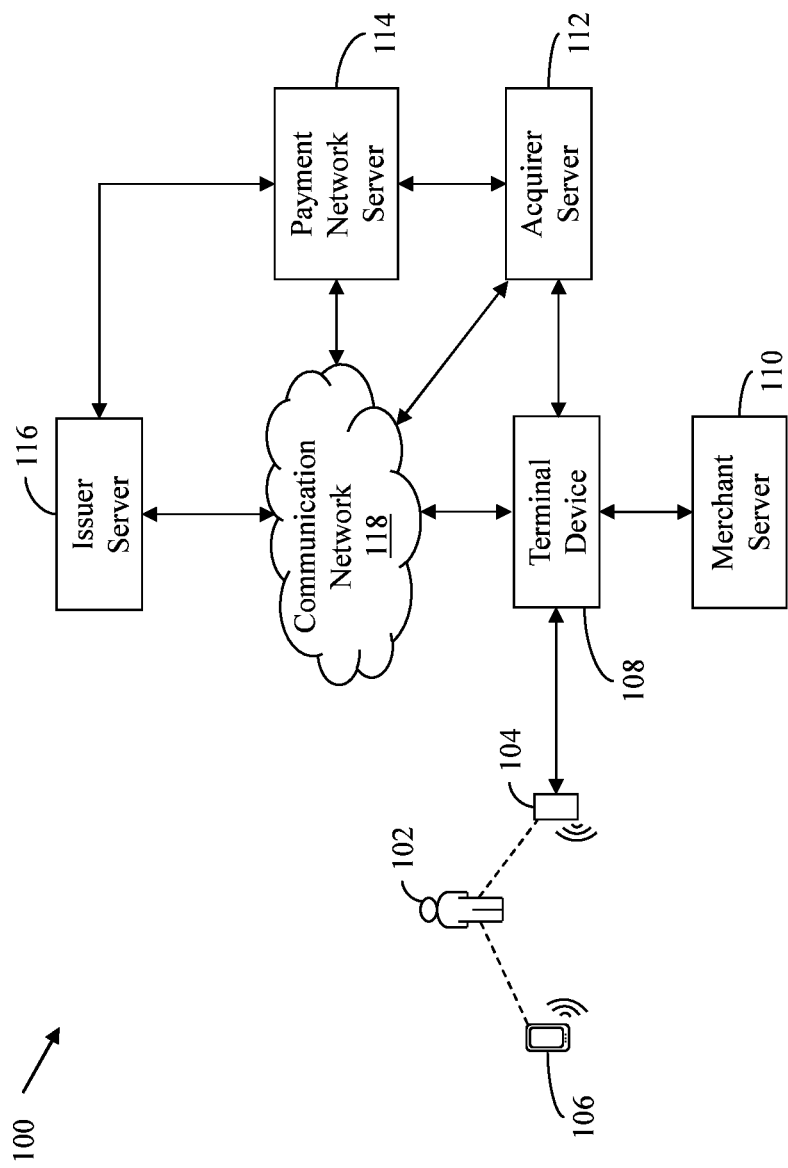
FIG. 1 is a block diagram that illustrates an exemplary environment for facilitating secure card-based transactions, in accordance with an exemplary embodiment of the disclosure.

Further areas of applicability of the disclosure will become apparent from the detailed description provided hereinafter. It should be understood that the detailed description of exemplary embodiments is intended for illustration purposes only and is, therefore, not intended to necessarily limit the scope of the disclosure.

DETAILED DESCRIPTION OF EMBODIMENTS

The disclosure is best understood with reference to the detailed figures and description set forth herein. Various embodiments are discussed below with reference to the figures. However, those skilled in the art will readily appreciate that the detailed descriptions given herein with respect to the figures are simply for explanatory purposes as the methods and systems may extend beyond the described embodiments. In one example, the teachings presented and the needs of a particular application may yield multiple alternate and suitable approaches to implement the functionality of any detail described herein. Therefore, any approach may extend beyond the particular implementation choices in the following embodiments that are described and shown.

References to "an embodiment", "another embodiment", "yet another embodiment", "one example", "another example", "yet another example", "for example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in an embodiment" does not necessarily refer to the same embodiment.

Overview

Card-based transactions present a potential risk of exposing sensitive card data of transaction cards to merchants. Exposed card data of a transaction card may lead to fraudulent use of the transaction card at merchant level, which is undesirable.

Various embodiments of the present disclosure provide a method and a system that solve the abovementioned problems by offering a means to safeguard sensitive card data of a transaction card during card-based transactions. The transaction card includes a memory that stores actual card data of the transaction card and a plurality of proxy datasets of the transaction card. The actual card data includes an actual transaction card number, an actual card verification value, and an actual expiry date of the transaction card and each of the plurality of proxy datasets includes a proxy transaction card number, a proxy card verification value, and a proxy expiry date linked to the transaction card. Each proxy dataset is configured for one-time use and is different from remaining proxy datasets. The system includes a payment network server that is configured to store a mapping database for the transaction card. The mapping database is indicative of a mapping between the actual card data of the transaction card and the plurality of proxy datasets of the transaction card.

Prior to initiating a transaction or using the transaction card at a terminal device (e.g., a point-of-sale device or an automated teller machine), a cardholder of the transaction card may utilize a corresponding user device to unlock a first proxy dataset from the plurality of proxy datasets. When the transaction card is used at the terminal device for initiating the transaction, instead of the actual card data, the unlocked first proxy dataset is communicated to the terminal device. Thus, the actual card data of the transaction card is rendered inaccessible to the terminal device. Based on the initiation of the transaction at the terminal device, the payment network server receives a transaction request for the transaction. The transaction request includes the first proxy dataset as an identifier to the transaction card and a mode indicator that indicates a presence of the first proxy dataset in the transaction request. Upon receiving the transaction request, the payment network server detects the presence of the first proxy dataset in the transaction request based on the mode indicator. When it is detected that the transaction request includes the first proxy dataset instead of the actual card data, the payment network server accesses the mapping database using the first proxy dataset to retrieve the actual card data of the transaction card. The payment network server then communicates the transaction request having the actual card data to an issuer of the transaction card for processing the transaction. The issuer processes the transaction based on the actual card data and generates a transaction response indicating a result of the processing of the transaction. The transaction response includes the actual card data of the transaction card. The issuer then communicates the transaction response to the payment network server. Upon receiving the transaction response, the payment network server accesses the mapping database for retrieving the first proxy dataset of the transaction card. The payment network server then communicates the transaction response having the first proxy dataset, instead of the actual card data, to the terminal device for notifying the result of the processing of the transaction. Since the first proxy dataset is configured for one-time use, the first proxy dataset expires and is permanently disabled for future use, after the initiation of the transaction.

Thus, the method and system of the disclosure ensure that the actual card data of the transaction card is not exposed to a merchant during card-based transactions. Since the first proxy dataset is disabled after the initiation of the transaction, the risk of the first proxy dataset being misused is also eliminated.

Terms Description (in Addition to Plain and Dictionary Meaning)

Transaction card is a payment means, such as a debit card, a credit card, a prepaid card, a promotional card, and/or a contactless card, that allows a cardholder to perform card-based transactions at terminal devices. In an embodiment, the transaction card may be radio frequency identification (RFID) or near field communication (NFC) enabled for performing the transactions at the terminal devices. The transaction card is issued to the cardholder by an issuer. The transaction card is operable in one of a regular transaction mode and a safe transaction mode. The transaction card includes a transaction card memory that stores actual card data and a plurality of proxy datasets of the transaction card.

Actual card data is the actual financial information associated with a transaction card that when compromised may lead to fraudulent use of the transaction card. The actual card data is set for long term use. The actual card data may include an actual transaction card number, an actual expiry date, an actual card verification value (CVV) number, or the like.

Proxy dataset refers to proxy financial information of a transaction card that when compromised may not lead to fraudulent use of the transaction card. The proxy dataset includes a proxy transaction card number, a proxy expiry date, a proxy card verification value (CVV) number, or the like. The proxy dataset is different from actual card data of the transaction card and is configured for one-time use. A memory of the transaction card stores a plurality of such pre-generated proxy datasets, e.g., 100,000 unique proxy datasets. Thus, when the transaction card is used at a terminal device, instead of the actual card data, one of the stored proxy datasets is unlocked and communicated to the terminal device as an identifier to the transaction card. After the use of the unlocked proxy dataset, the proxy dataset expires and is disabled for any future use.

Mapping database refers to a data structure that is indicative of an association between actual card data of a transaction card and a plurality of proxy datasets of the transaction card. The mapping database is maintained at a payment network, such as Mastercard®, associated with the transaction card. In one example, the mapping database is a tabular database that has various rows and columns to store the actual card data and the plurality of proxy datasets. The mapping database is stored in an encrypted format at the payment network to ensure data security to cardholders.

Transaction request refers to a transaction message that includes various details pertaining to a transaction. In one example, the transaction request is pursuant to one or more standards for the interchange of transaction messages (such as the ISO8583 standard), and includes various fields (such as data elements (DEs)) for storing the transaction details. When the transaction is initiated by way of a transaction card that is operating in a safe transaction mode, the transaction request includes a proxy dataset of the transaction card, instead of the actual card data, as an identifier to the transaction card.

Terminal device is an electronic device that enables a user to perform electronic transactions. Examples of the terminal device include an automated teller machine (ATM), a point-of-sale (POS) device, a mobile POS (MPOS) device, a point-of-interaction (POI) device, a point-of-purchase (POP) device, a currency recycler, a bunch note acceptor, or the like.

Issuer is a financial institution which establishes and maintains user accounts of several users. The issuer processes transactions in accordance with various payment network regulations and local legislation.

Payment networks, such as those operated by Mastercard, process transactions between acquirers and issuers. Processing by a payment network includes steps of authorization, clearing, and settlement.

Server is a physical or cloud data processing system on which a server program runs. The server may be implemented in hardware or software, or a combination thereof. In one embodiment, the server may be implemented in computer programs executing on programmable computers, such as personal computers, laptops, or a network of computer systems. The server may correspond to one of a merchant server, an acquirer server, a payment network server, or an issuer server.

FIG. 1 is a block diagram that illustrates an exemplary environment 100 for facilitating secure card-based transactions, in accordance with an exemplary embodiment of the disclosure. The exemplary environment 100 includes a user 102 who is a cardholder of a transaction card 104 and in possession of a user device 106. The exemplary environment 100 further includes a terminal device 108, a merchant server 110, an acquirer server 112, a payment network server 114, and an issuer server 116. The terminal device 108, the merchant server 110, the acquirer server 112, the payment network server 114, and the issuer server 116 communicate with each other by way of a communication network 118 or through separate communication networks established therebetween.

The user 102 is an individual, who is an account holder of a payment account maintained at a financial institution, such as an issuer. The issuer may have issued one or more transaction cards (e.g., the transaction card 104) to the user 102 for enabling the user 102 to perform payment transactions from the payment account. The user 102 may further own the user device 106. The user 102 may utilize the transaction card 104 to perform a card-based transaction from the payment account. Examples of the card-based transaction may include, but are not limited to, an offline purchase transaction at a merchant store, an online purchase transaction at a merchant website, a cash-withdrawal transaction, a loyalty points or reward points redemption transaction, or the like.

Figure 2:
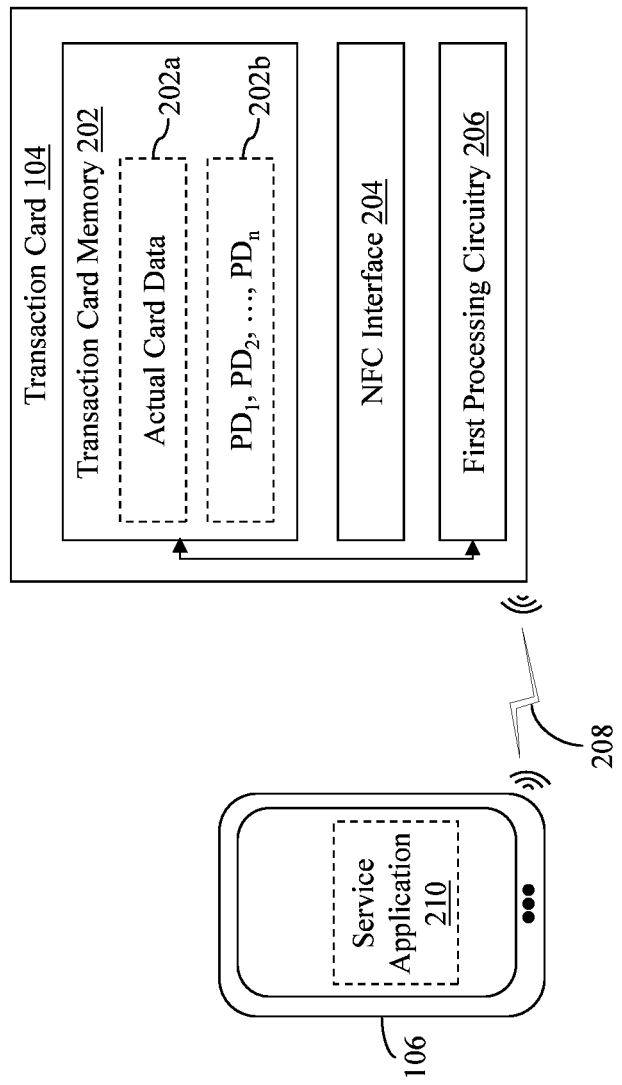
FIG. 2 is a block diagram that illustrates an exemplary transaction card for performing secure card-based transactions, in accordance with an exemplary embodiment of the disclosure.

The transaction card 104 is a physical card that is linked to the payment account of the user 102. The transaction card 104 may include suitable logic, circuitry, and/or interfaces that enable the user 102 to perform transactions from the payment account. Examples of the transaction card 104 may include, but are not limited to, a debit card, a credit card, a prepaid card, a promotional card, and/or a contactless card. The transaction card 104 includes a transaction card memory (as shown in FIG. 2) that stores actual card data of the transaction card 104. The actual card data may include an actual card number, an actual expiry date, and an actual card verification value (CVV) of the transaction card 104. The transaction card memory further stores a plurality of proxy datasets that are pre-generated and linked to the transaction card 104. Each proxy dataset may include a proxy card number, a proxy expiry date, and a proxy CVV. Each proxy dataset is unique and different from the actual card data. The transaction card 104 may be radio frequency identification (RFID) or near field communication (NFC) enabled for performing contactless transactions and communicating with the user device 106. The transaction card 104 is configured to operate in one of a regular transaction mode or a safe transaction mode for initiating transactions at the terminal device 108. When the transaction card 104 is operating in the regular transaction mode, the actual card data of the transaction card 104 is used for initiating the transaction. When the transaction card 104 is operating in the safe transaction mode, one of the plurality of proxy datasets of the transaction card 104 is used for initiating the transaction and the actual card data is safeguarded from exposure. The safe transaction mode for the transaction card 104 may be activated based on a communication between the transaction card 104 and the user device 106.

The user device 106 is a communication device of the user 102. The user device 106 may include suitable logic, circuitry, interfaces, and/or code, executable by the circuitry, for executing a service application (shown in FIG. 2) hosted by the payment network server 114 or the issuer server 116. The service application running on the user device 106 may serve as a gateway to a corresponding host server. The user device 106 may be used by the user 102 to activate the safe transaction mode for the transaction card 104. For example, when the user 102 wants to perform a secure card-based transaction at an unreliable merchant, the user device 106 may be used by the user 102 to switch the transaction card 104 from the regular transaction mode to the safe transaction mode. The user device 106 is capable of communicating via the communication network 118. The user device 106 further supports various types of NFC technologies, such as Bluetooth, Zigbee, Wi-Fi, or the like for communicating with the transaction card 104. Examples of the user device 106 may include a mobile phone, a smartphone, a laptop, a tablet, a phablet, or any other portable NFC enabled communication device.

The terminal device 108 is an electronic device that enables the user 102 to perform various transactions using the transaction card 104. Examples of the terminal device 108 may include an automated teller machine (ATM), a point-of-sale (POS) device, a mobile POS (MPOS) device, a point-of-interaction (POI) device, a point-of-purchase (POP) device, a bunch note acceptor, a currency recycler, or the like. The terminal device 108 may include suitable logic, circuitry, interfaces, and/or code, executable by the circuitry, to read and decrypt the information (e.g., the actual card data and one of the plurality of proxy datasets) stored in the transaction card memory of the transaction card 104. When a transaction is initiated at the terminal device 108 by use of the transaction card 104, the terminal device 108 communicates various transaction details to the acquirer server 112 in an encrypted format. The transaction details may include a transaction amount, a time of transaction, an identifier of the terminal device 108, a transaction identifier, the information read from the transaction card 104, or the like. The information read from the transaction card 104 includes one of the actual card data or a proxy dataset based on the mode of operation of the transaction card 104. For example, when the transaction card 104 is operating in the regular transaction mode, the actual card data of the transaction card 104 is read by the terminal device 108. When the transaction card 104 is operating in the safe transaction mode, instead of the actual card data, one of the plurality proxy datasets is read by the terminal device 108. Thus, the terminal device 108 is restricted from accessing the actual card data of the transaction card 104 in the safe transaction mode. In one embodiment, when the terminal device 108 is a POS device and installed at a merchant store of a merchant (not shown), the terminal device 108 may communicate the transaction details to the merchant server 110 for record maintenance. Based on the processing of the transaction, the terminal device 108 may receive a transaction response from the acquirer server 112 indicating whether the transaction is approved or declined.

The merchant server 110 is a computing server that is associated with the merchant. The merchant may establish a merchant account with another or same financial institution, such as an acquirer, to accept payments for products and/or services that are offered for sale by the merchant. In one embodiment, the merchant may have the terminal device 108, which is a POS device, a POP device, or a POI device, installed at the merchant store. The merchant server 110 may include suitable logic, circuitry, interfaces, and/or code, executable by the circuitry, for maintaining a record of various transactions performed at the terminal device 108.

The acquirer server 112 is a computing server that is operated by the acquirer. The acquirer server 112 is configured to receive transaction details of various card-based transactions performed at the terminal device 108 and transmit transaction requests to payment networks or issuers for processing the corresponding card-based transactions. The transaction requests include the transaction details of the corresponding card-based transactions. When a transaction is initiated by using the transaction card 104 operating in the regular transaction mode, a transaction request of the transaction includes the actual card data of the transaction card 104 as an identifier to the transaction card 104. However, when the transaction is initiated by using the transaction card 104 operating in the safe transaction mode, the transaction request includes one of the plurality of proxy datasets as an identifier to the transaction card 104. The acquirer server 112 is configured to credit payment accounts of various merchants with transaction amounts, when the corresponding transactions are approved.

Figure 3:
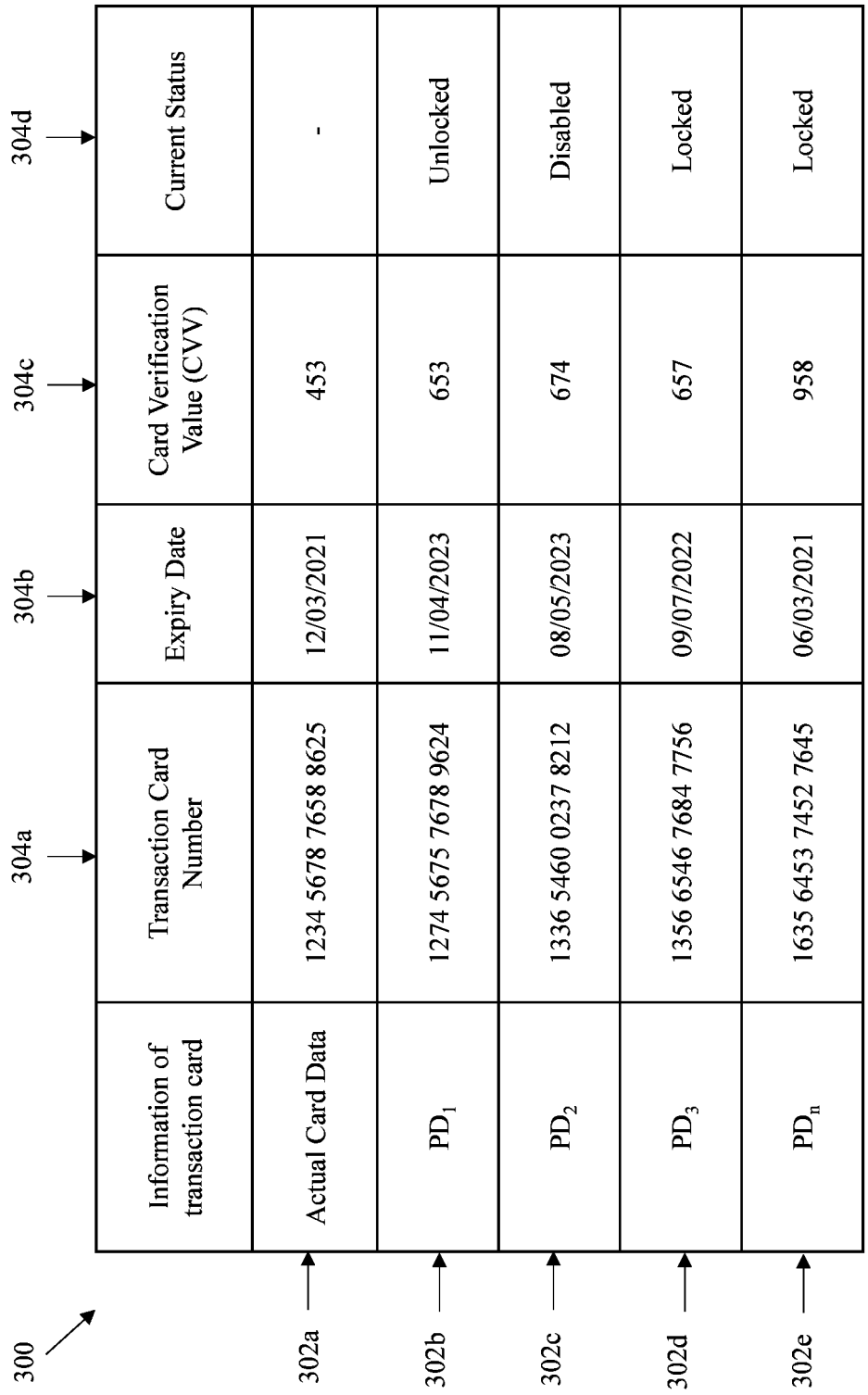
FIG. 3 is a Table that illustrates an exemplary mapping database maintained at a payment network server of FIG. 1 for facilitating secure card-based transactions, in accordance with an exemplary embodiment of the disclosure.

The payment network server 114 is a computing server that is operated by a payment network and may include suitable logic, circuitry, interfaces, and/or code, executed by the circuitry, for processing transactions. The payment network server 114 represents an intermediate entity between the acquirer server 112 and the issuer server 116 for processing the card-based transactions. The payment network server 114 is configured to store a mapping database (as shown in FIG. 3) associated with various transaction cards, e.g., the transaction card 104. The mapping database is indicative of a mapping between the actual card data of the transaction card 104 and the plurality of proxy datasets of the transaction card 104. The payment network server 114 may receive, from the acquirer server 112, the transaction request for the transaction that is initiated using the transaction card 104. When the payment network server 114 detects the presence of a proxy dataset in the received transaction request, the payment network server 114 accesses the mapping database to retrieve the actual card data of the transaction card 104. The payment network server 114 then replaces the proxy dataset in the transaction request with the actual card data of the transaction card 104 and communicates the transaction request having the actual card data to the issuer server 116 associated with the transaction card 104. Based on the processing of the transaction, the payment network server 114 receives a transaction response for the transaction from the issuer server 116.

Figure 6:
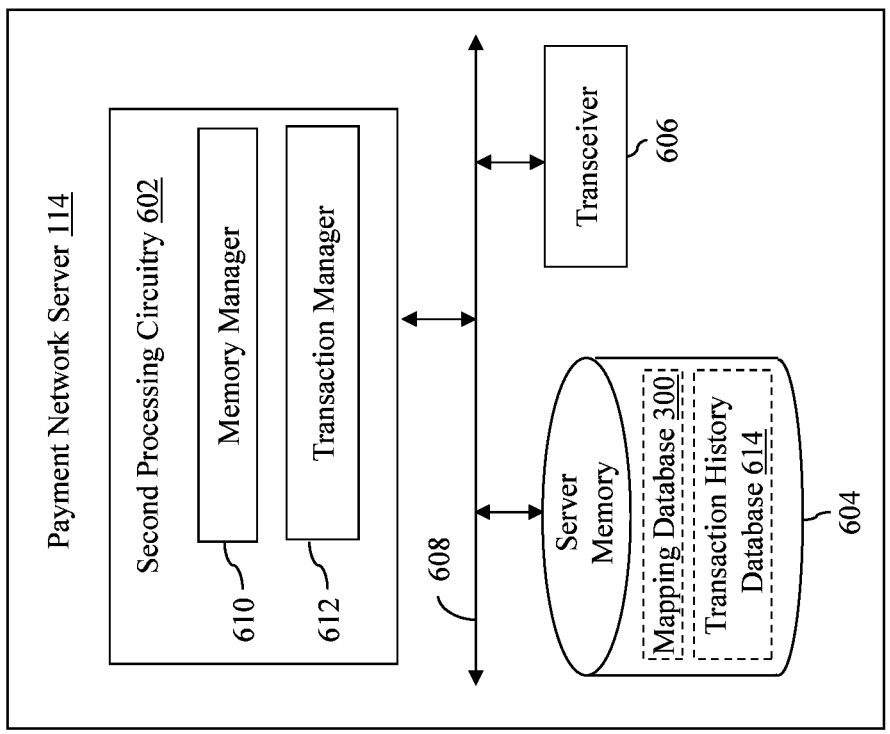
FIG. 6 is a block diagram that illustrates the payment network server, in accordance with an exemplary embodiment of the disclosure.

The transaction response includes the actual card data of the transaction card 104. The payment network server 114 then replaces the actual card data in the transaction request with the previously replaced proxy dataset and communicates the transaction response having the proxy dataset to the acquirer server 112. The payment network server 114 is further configured to maintain and update a transaction history database (as shown in FIG. 6) to store transaction details of various transactions that correspond to the payment network server 114.

The issuer server 116 is a computing server that is operated by the issuer. The issuer server 116 may include suitable logic, circuitry, interfaces, and/or code, executable by the circuitry, for processing transactions. The issuer is a financial institution that manages payment accounts of multiple users, such as the user 102. Account details of the payment accounts, established with the issuer are stored as account profiles in a memory (not shown) of the issuer server 116 or on a cloud server associated with the issuer server 116. The account details may include an account balance, an available credit line, details of an account holder, transaction history of the account holder, account information, or the like. The details of the account holder may include name, age, gender, physical attributes, registered contact number, alternate contact number, registered e-mail ID, or the like of the account holder. The issuer server 116 is configured to process various transactions based on the transaction requests received from the payment network server 114. Methods for processing transactions via the issuer server 116 will be apparent to a person of ordinary skill in the art and may include processing the transactions via the traditional four-party system or the traditional three-party system.

In one embodiment, the issuer server 116 may be configured to generate the plurality of proxy datasets for the transaction card 104 and store the plurality of proxy datasets in the transaction card memory of the transaction card 104. In one embodiment, various proxy transaction card numbers in the plurality of proxy datasets and the actual transaction card number of the transaction card 104 may have the same bank identification number (BIN). A BIN refers to initial four to six digits in a transaction card number of a transaction card and uniquely identifies an issuer of the transaction card. Thus, all transaction cards issued by the same issuer may have a BIN that belongs to a range of BINs allocated to the issuer. The issuer server 116 may further communicate the plurality of proxy datasets generated for the transaction card 104 to the payment network server 114 for storing in the mapping database. The plurality of proxy datasets for the transaction card 104 may be generated in such a manner that no two transaction cards have any proxy dataset in common and no proxy dataset is same as actual card data of any transaction card. To ensure that no two proxy datasets generated by the issuer server 116 are same, the issuer server 116 may be configured to maintain a record of all the generated proxy datasets in a corresponding memory.

Examples of the merchant server 110, the acquirer server 112, the payment network server 114, and the issuer server 116 may include, but are not limited to, computers, laptops, mini-computers, mainframe computers, any non-transient and tangible machines that can execute a machine-readable code, cloud-based servers, distributed server networks, a network of computer systems, or a combination thereof.

The communication network 118 is a medium through which content and messages are transmitted between the terminal device 108, the merchant server 110, the acquirer server 112, the payment network server 114, and the issuer server 116, or other entities involved in transaction processing. Examples of the communication network 118 may include, but are not limited to, a Wi-Fi network, a light fidelity (Li-Fi) network, a local area network (LAN), a wide area network (WAN), a metropolitan area network (MAN), a satellite network, the Internet, a fiber optic network, a coaxial cable network, an infrared (IR) network, a radio frequency (RF) network, and combinations thereof. Various entities in the exemplary environment 100 may connect to the communication network 118 in accordance with various wired and wireless communication protocols, such as Transmission Control Protocol and Internet Protocol (TCP/IP), User Datagram Protocol (UDP), Long Term Evolution (LTE) communication protocols, or any combination thereof.

FIG. 2 is a block diagram that illustrates the transaction card 104 for performing secure card-based transactions, in accordance with an exemplary embodiment of the disclosure. The transaction card 104 includes the transaction card memory (hereinafter, designated as "the transaction card memory 202"), an NFC interface 204, and first processing circuitry 206. The transaction card 104 is configured to operate in one of the regular transaction mode and the safe transaction mode for performing card-based transactions.

The transaction card memory 202 may include suitable logic, circuitry, interfaces, and/or codes, executable by the circuitry, for storing the information (i.e., the actual card data and the plurality of proxy datasets $PD_1$-$PD_n$) of the transaction card 104. The transaction card memory 202 stores the information in an encrypted format so as to ensure data security to the user 102. The transaction card memory 202 is a machine-readable data storage device that is partitioned into first and second memory blocks 202a and 202b. The first memory block 202a is configured to store the actual card data of the transaction card 104 and the second memory block 202b is configured to store the plurality of proxy datasets $PD_1$-$PD_n$ (e.g., 100,000 unique proxy datasets) of the transaction card 104. When the transaction card 104 is operating in the regular transaction mode, the first memory block 202a is enabled and the second memory block 202b is disabled, for read operation. Likewise, when the transaction card 104 is operating in the safe transaction mode, the first memory block 202a is disabled and the second memory block 202b is enabled, for read operation. Examples of the transaction card memory 202 may include non-volatile memory sources such as, but are not limited to, an electronic chip and/or a magnetic stripe.

The NFC interface 204 may include suitable logic, circuitry, interfaces, and/or codes, executable by the circuitry, that enable the transaction card 104 to be communicatively paired with the user device 106 via an NFC channel 208. Examples of various NFC technologies supported by the NFC interface 204 may include Bluetooth, Zigbee, Wi-Fi, or the like.

The first processing circuitry 206 may include suitable logic, circuitry, interfaces, and/or codes, executable by the circuitry, for performing one or more memory management operations on the transaction card memory 202. Examples of the first processing circuitry 206 may include, but are not limited to, an application specific integrated circuit (ASIC) processor, a reduced instruction set computer (RISC) processor, a complex instruction set computer (CISC) processor, a field programmable gate array (FPGA), or the like. In one embodiment, the first processing circuitry 206 may set the regular transaction mode as default for the transaction card 104. In the regular transaction mode, the first processing circuitry 206 enables the first memory block 202a and disables the second memory block 202b, for read operation. The first processing circuitry 206 causes the transaction card 104 to switch from the regular transaction mode to the safe transaction mode based on a communication between the user device 106 and the transaction card 104 (e.g., a mode switching request of the user 102 received via the NFC channel 208). The user 102 may utilize the service application (hereinafter, designated and referred to as "the service application 210") running on the user device 106 to activate the safe transaction mode of the transaction card 104. In the safe transaction mode, the first processing circuitry 206 disables the first memory block 202a and enables the second memory block 202b, for read operation. When operating in the safe transaction mode, the first processing circuitry 206 is configured to unlock, for a limited time-period, one of the plurality of proxy datasets $PD_1$-$PD_n$, which has not been used in the past. Upon the expiry of the limited time-period or the use of the unlocked proxy dataset in a transaction, the first processing circuitry 206 disables the unlocked proxy dataset for any future use and causes the transaction card 104 to switch to the regular transaction mode from the safe transaction mode. Activation of the safe transaction mode is explained in detail in conjunction with FIG. 4.

FIG. 3 is a Table that illustrates an exemplary mapping database 300 maintained at the payment network server 114 for facilitating secure card-based transactions, in accordance with an exemplary embodiment of the disclosure. The mapping database 300 is shown to store the information of the transaction card 104. For the sake of brevity, the mapping database 300 is shown to be in a tabular format. However, in actual implementation, the mapping database 300 may store information of multiple transaction cards in any database format, without deviating from the scope of the disclosure.

The mapping database 300 is indicative of a mapping between the actual card data of the transaction card 104 and the plurality of proxy datasets $PD_1$-$PD_n$ of the transaction card 104. The mapping database 300 includes rows 302a-302e and columns 304a-304d. The row 302a stores the actual card data of the transaction card 104 and the rows 302b-302e store the plurality of proxy datasets $PD_1$-$PD_n$ of the transaction card 104. The columns 304a-304c store transaction card numbers, expiry dates, and CVVs, respectively, pertaining to the actual card data and the plurality of proxy datasets $PD_1$-$PD_n$ of the transaction card 104.

For example, the row 302a indicates that the actual card data of the transaction card 104 includes the actual transaction card number '1234 5678 7658 8625', the actual expiry date '12/03/2021', and the actual CVV '453'. Likewise, the row 302b indicates that a first proxy dataset $PD_1$ of the transaction card 104 includes a first proxy transaction card number '1234 5675 7678 9624', a first proxy expiry date '11/04/2023', and a first proxy CVV '653'. The row 302c indicates that a second proxy dataset $PD_2$ of the transaction card 104 includes a second proxy transaction card number '1234 5660 0237 8212', a second proxy expiry date '08/05/2023', and a second proxy CVV '674'. The row 302d indicates that a third proxy dataset $PD_3$ of the transaction card 104 includes a third proxy transaction card number '1234 5646 7684 7756', a third proxy expiry date '09/07/2022', and a third proxy CVV '657'. Similarly, the row 302e indicates that an $N^{th}$ proxy dataset $PD_n$ of the transaction card 104 includes an $N^{th}$ proxy transaction card number '1234 5653 7452 7645', an $N^{th}$ proxy expiry date '06/03/2021', and an $N^{th}$ proxy CVV '958'. As shown in FIG. 3, the proxy transaction card numbers and the actual transaction card number of the transaction card 104 have the same BINs.

The mapping database 300 further includes the column 304d to indicate a current status of each of the plurality of proxy datasets $PD_1$-$PD_n$. The current status of a proxy dataset in the transaction card 104 may indicate whether the proxy dataset is unlocked for current use, locked and unused, or disabled for any future use. For example, the current status of the first proxy dataset $PD_1$ indicates that the first proxy dataset $PD_1$ in the transaction card 104 has been unlocked for current use. The current status of the second proxy dataset $PD_2$ indicates that the second proxy dataset $PD_2$ in the transaction card 104 has been used previously and is now disabled for any future use. Similarly, the current statuses of the third and $N^{th}$ proxy datasets $PD_3$ and $PD_n$ indicate that the respective second and $N^{th}$ proxy datasets $PD_3$ and $PD_n$ in the transaction card 104 are unused and locked.

For ensuring compliance with data security standards and ensuring data security to users, the payment network server 114 stores the information of the transaction card 104 in the mapping database 300 in an encrypted format.

Figure 4:
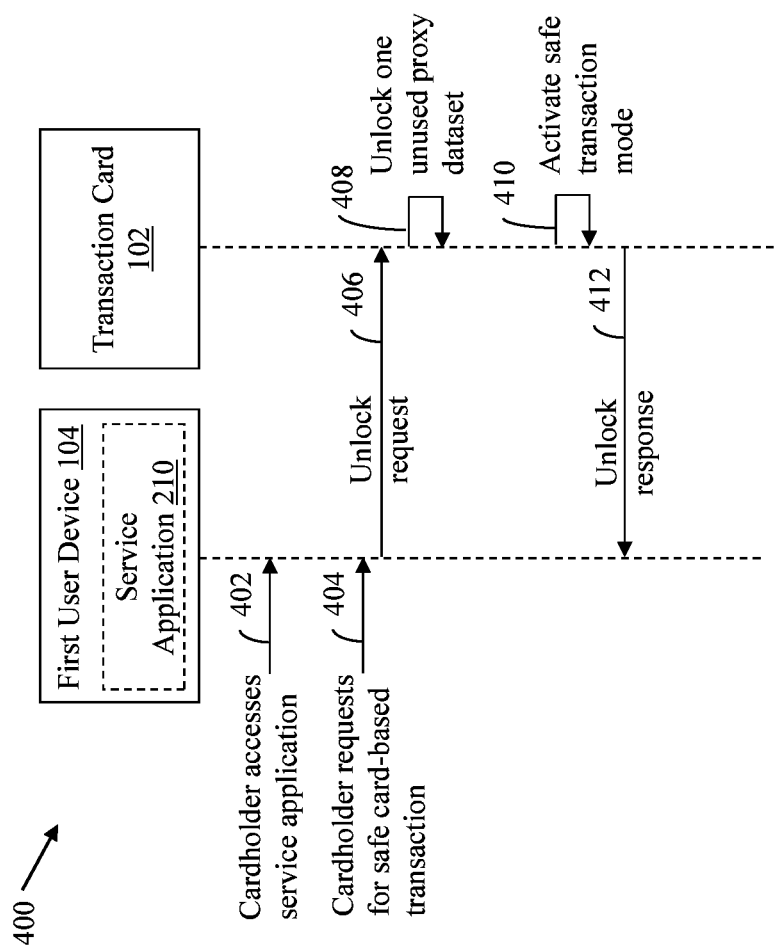
FIG. 4 is a process flow diagram that illustrates an exemplary process for activating a safe transaction mode of a transaction card of FIG. 1, in accordance with an exemplary embodiment of the disclosure.

FIG. 4 is a process flow diagram 400 that illustrates an exemplary process for activating the safe transaction mode of the transaction card 104, in accordance with an exemplary embodiment of the disclosure. In one embodiment, the transaction card 104 may be configured to operate in the safe transaction mode by default. In such a scenario, activation of the safe transaction mode is not required. In another embodiment, the transaction card 104 may be configured to operate in the regular transaction mode by default. Thus, in such a scenario, activation of the safe transaction mode is required before initiating a secure card-based transaction. For the sake of brevity, it is assumed that the regular transaction mode is the default mode of operation for the transaction card 104.

The user 102 may want to perform a secure card-based transaction (hereinafter, referred to as "transaction") at the terminal device 108 of the merchant by using the transaction card 104. For performing the secure transaction, the safe transaction mode of the transaction card 104 is required to be activated. For activating the safe transaction mode, the user 102 accesses (i.e., opens or logs-in to) the service application 210 executed on the user device 106 (as shown by arrow 402). In one example, the user 102 accesses the service application 210 while the transaction card 104 is within an NFC range of the user device 106. The user 102 then selects a safe transaction option presented by the service application 210 to request for a safe transaction (as shown by arrow 404). Based on the selection of the safe transaction option, the service application 210 generates an unlock request and communicates the unlock request to the transaction card 104, which is communicatively paired to the user device 106, via the NFC channel 208 (as shown by arrow 406). The transaction card 104 receives the unlock request from the user device 106.

Based on the unlock request, the first processing circuitry 206 unlocks one of the plurality of proxy datasets $PD_1$-$PD_n$ that is unused (as shown by arrow 408). For example, the first processing circuitry 206 unlocks the first proxy datasets $PD_1$, which has not been used in the past, for a limited time-period (such as 30 minutes, 15 minutes, one hour, or the like). In one embodiment, the duration of the limited time-period may be defined by the user 102 using the service application 210. In other words, the first proxy datasets $PD_1$ is unlocked based on a communication established between the transaction card 104 and the user device 106 via the NFC channel 208.

Upon unlocking the first proxy dataset $PD_1$, the first processing circuitry 206 activates, for the limited time-period, the safe transaction mode for the transaction card 104 (as shown by arrow 410). When the safe transaction mode is activated, the first processing circuitry 206 disables the first memory block 202a for any read operation. Further, the first processing circuitry 206 enables the second memory block 202b for read operation. The proxy datasets in the second memory block 202b that are either disabled or locked may not be readable by any external device (e.g., the terminal device 108). Thus, in the safe transaction mode, though the second memory block 202b is enabled for read operation, only the unlocked proxy dataset (i.e., the first proxy dataset $PD_1$) in the second memory block 202b is readable.

Upon successful activation of the safe transaction mode, the transaction card 104 communicates an unlock response to the user device 106 through the NFC channel 208 (as shown by arrow 412). The user device 106 receives the unlock response and renders a user interface to present the unlock response to the user 102. In one embodiment, the unlock response may include information pertaining to the unlocked first proxy dataset $PD_1$. The user 102 may utilize the received information pertaining to the unlocked first proxy dataset $PD_1$ to carry out an online transaction on the user device 106.

In one embodiment, if the unlock request is received by the transaction card 104 from an unidentified device (i.e., a device that is not synced with the transaction card 104), none of the plurality of proxy datasets $PD_1$-$PD_n$ may be unlocked. Thus, any fraudulent unlocking of a proxy dataset is prevented.

Figure 5A:
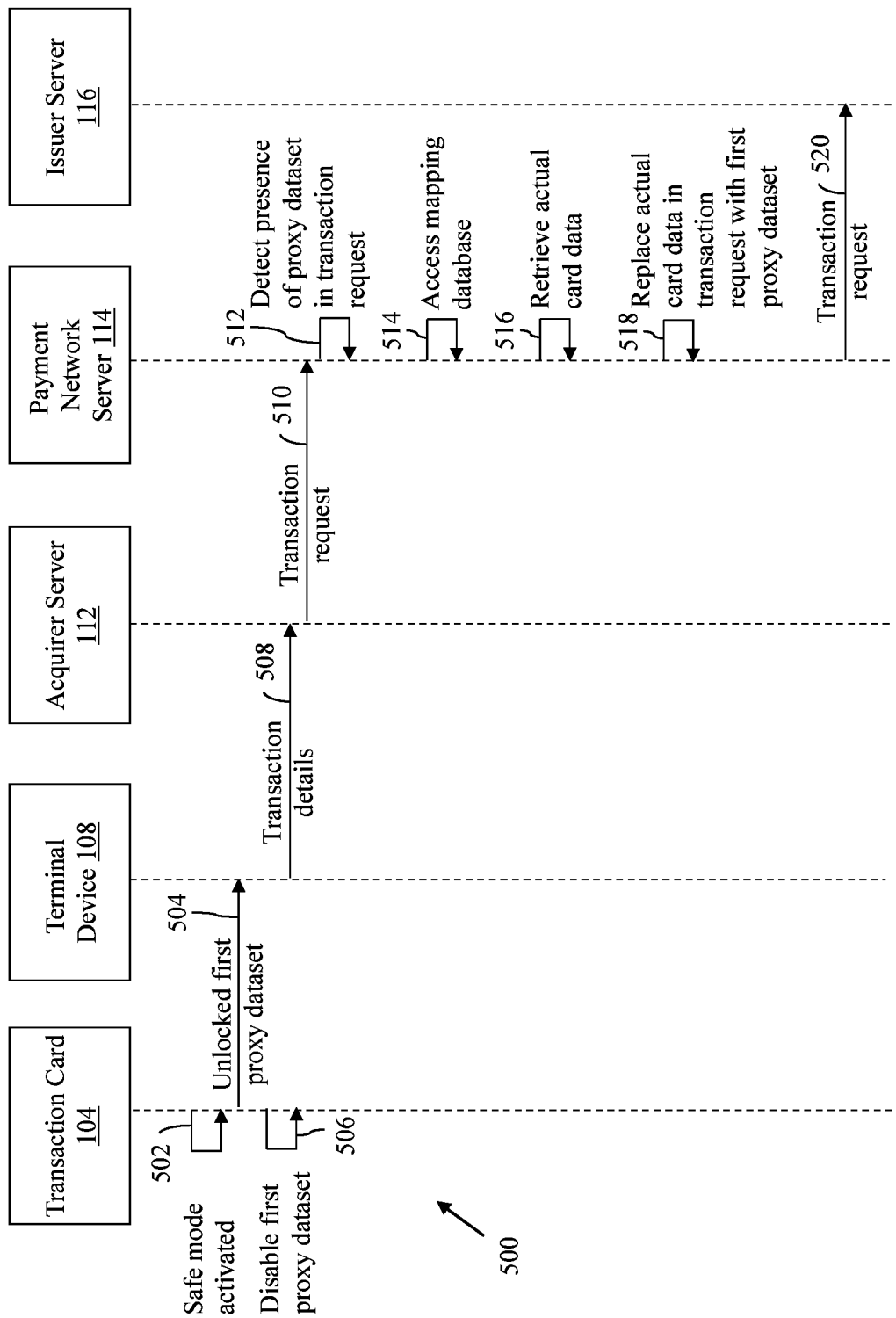
FIGS. 5A and 5B, collectively represent a process flow diagram that illustrates an exemplary process for facilitating a secure card-based transaction using the transaction card, in accordance with an exemplary embodiment of the disclosure.
Figure 5B:
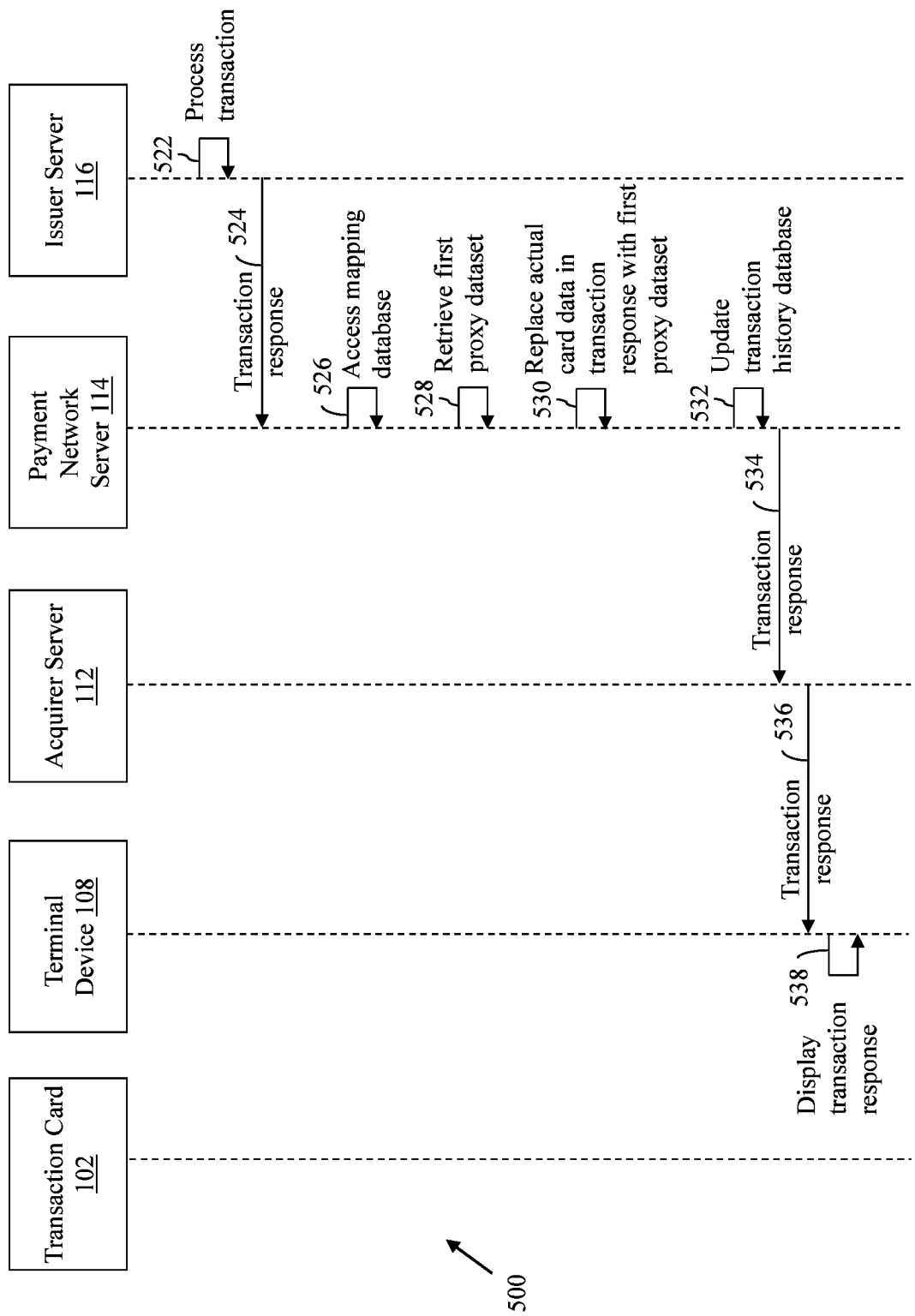

FIGS. 5A and 5B, collectively represent a process flow diagram 500 that illustrates an exemplary process for facilitating a secure card-based transaction using the transaction card 104, in accordance with an exemplary embodiment of the disclosure.

With reference to FIG. 5A, for performing a secure card-based transaction, the safe transaction mode of the transaction card 104 is activated (as shown by arrow 502). The activation of the safe transaction mode is described in the foregoing description of FIG. 4. The transaction card 104 is used by the user 102 at the terminal device 108 for initiating the card-based transaction (hereinafter, referred to as "transaction"). When the transaction card 104 is used at the terminal device 108, the unlocked first proxy dataset $PD_1$ is read by the terminal device 108 from the second memory block 202b (as shown by arrow 504). Since the transaction card 104 is operating in the safe transaction mode and the first proxy dataset $PD_1$ is unlocked, the terminal device 108 is restricted to access the first memory block 202a for any read-write operation. Thus, the actual card data stored in the first memory block 202a is rendered inaccessible to the terminal device 108 when the first proxy dataset $PD_1$ is unlocked. The transaction card 104 may further communicate a mode indicator to the terminal device 108. The mode indicator indicates the mode of operation of the transaction card 104. For example, the mode indicator may be set to '1' to indicate that the transaction card 104 is operating in the safe transaction mode and '0' to indicate that the transaction card 104 is operating in the regular transaction mode. Other details, such as a transaction amount, pertaining to the transaction, may also be entered to the terminal device 108. Upon communication of the unlocked first proxy dataset $PD_1$ to the terminal device 108, the first processing circuitry 206 permanently disables the unlocked first proxy dataset $PD_1$ for use (as shown by arrow 506). In other words, once the unlocked first proxy dataset $PD_1$ is read by the terminal device 108, the first processing circuitry 206 permanently disables the first proxy dataset $PD_1$ for any future use.

The terminal device 108 then communicates transaction details of the transaction to the acquirer server 112 via the communication network 118 in an encrypted format (as shown by arrow 508). The transaction details may include the transaction amount, a time of the transaction, an identifier of the terminal device 108, a transaction identifier, the first proxy dataset $PD_1$ read from the transaction card 104, the mode indicator, and/or the like.

The acquirer server 112 receives the transaction details from the terminal device 108 and generates a transaction request, including the transaction details, for the transaction. The transaction request is pursuant to one or more standards for the interchange of transaction messages (such as the ISO8583 standard), and includes various fields (such as data elements) for storing the transaction details. For example, the acquirer server 112 may add the first proxy dataset $PD_1$ to those data elements that are configured to store the actual card data of the transaction card 104. In the transaction request, the first proxy dataset $PD_1$ is used as an identifier to the transaction card 104. The acquirer server 112 then identifies a payment network that corresponds to the transaction card 104, as known by those skilled in the art. The acquirer server 112 then communicates the transaction request to the payment network server 114 of the identified payment network via the communication network 118 (as shown by arrow 510).

The payment network server 114 receives the transaction request from the acquirer server 112. The payment network server 114 detects a presence of a proxy dataset in the transaction request based on the mode indicator in the transaction request (as shown by arrow 512). When the mode indicator indicates that the transaction card 104 is in the regular transaction mode, the payment network server 114 determines that no proxy data is present in the transaction request. However, in the current scenario, the mode indicator indicates that the transaction card 104 is in the safe transaction mode. Thus, the payment network server 114 detects that the identifier to the transaction card 104 in the transaction request is a proxy dataset instead of the actual card data.

The payment network server 114 utilizes the first proxy dataset $PD_1$ in the transaction request to access the mapping database 300 (as shown by arrow 514). Since all proxy datasets in the mapping database 300 are unique, same proxy dataset may not be mapped to actual card data of any two transaction cards. Thus, by looking-up the mapping database 300, the payment network server 114 retrieves the actual card data (i.e., the row 302a) that is mapped to the first proxy dataset $PD_1$ (as shown by arrow 516). The payment network server 114 then replaces the first proxy dataset $PD_1$ in the transaction request with the retrieved actual card data (as shown by arrow 518). Thus, after replacement, the transaction request includes the actual card data as an identifier to the transaction card 104. Initially, the current status (i.e., the column 304d) of the first proxy dataset $PD_1$ in the mapping database 300 may be set to locked. Upon the detection of the first proxy dataset $PD_1$ in the mapping database 300, the payment network server 114 may update the current status to 'unlocked' to indicate that the first proxy dataset $PD_1$ is currently in use.

Based on the actual card data, the payment network server 114 identifies the issuer that corresponds to the transaction card 104, as known by those skilled in the art. Once the issuer is identified, the payment network server 114 communicates the transaction request having the actual card data of the transaction card 104 to the issuer server 116 of the identified issuer (as shown by arrow 520).

With reference to FIG. 5B, the issuer server 116 receives the transaction request from the payment network server 114 and processes the transaction for approval or decline (as shown by arrow 522). For example, the issuer server 116 may retrieve an account balance of the payment account linked to the transaction card 104. The issuer server 116 may approve the transaction when the transaction amount is less than or equal to the account balance and the user 102 is successfully authenticated. The issuer server 116 may decline the transaction when either the transaction amount is greater than the account balance or the user 102 is not successfully authenticated. The issuer server 116 then generates a transaction response indicating a result of the processing of the transaction. The transaction response further includes the transaction details of the transaction and the mode indicator. The issuer server 116 communicates the transaction response including the actual card data of the transaction card 104 to the payment network server 114 (as shown by arrow 524).

The payment network server 114 receives the transaction response from the issuer server 116. Upon reception of the transaction response, the payment network server 114 determines whether the transaction response corresponds to a transaction that is initiated by a transaction card in the safe transaction mode. In this scenario, based on the mode indicator in the transaction response, the payment network server 114 determines that the transaction response is associated with the transaction card 104 that is currently being used in the safe transaction mode. Thus, the payment network server 114 utilizes the actual card data in the transaction response to access the mapping database 300 (as shown by arrow 526). By looking-up the mapping database 300, the payment network server 114 retrieves the first proxy dataset $PD_1$ that is unlocked and mapped to the actual card data (as shown by arrow 528). The payment network server 114 then replaces the actual card data in the transaction response with the retrieved first proxy dataset $PD_1$ (as shown by arrow 530). Thus, after replacement, the transaction response includes the first proxy dataset $PD_1$. The payment network server 114 may further update the current status of the first proxy dataset $PD_1$ in the mapping database 300 to 'disabled' to indicate that the first proxy dataset $PD_1$ is used and is no longer valid for initiating any other transaction.

The payment network server 114 further updates the transaction history database (as shown in FIG. 6) to store the transaction details of the transaction (as shown by arrow 532). For example, the payment network server 114 may update the transaction history database to store a new entry pertaining to the current transaction. The new entry in the transaction history database may indicate the transaction amount, the time of the transaction, the identifier of the terminal device 108, the transaction identifier, the first proxy dataset $PD_1$ used in the transaction, the actual card data, an identifier of the issuer, or the like. The payment network server 114 communicates the transaction response including the first proxy dataset $PD_1$ to the acquirer server 112 (as shown by arrow 534), which in turn communicates the transaction response to the terminal device 108 (as shown by arrow 536). The terminal device 108 displays the transaction response on a corresponding display to notify the user 102 regarding the result of the processing of the transaction (as shown by arrow 538). The actual card data of the transaction card 104 is not exposed to the terminal device 108 and the merchant server 110, when the transaction card 104 is operating in the safe transaction mode. Thus, the user 102 may choose to perform card-based transactions in the safe transaction mode when security of the actual card data seems to be at risk.

In one embodiment, the user 102 may not use the transaction card 104 at the terminal device 108 within the limited time-period for which the first proxy dataset $PD_1$ is unlocked. After the lapse of the limited time-period, the first proxy dataset $PD_1$ is permanently disabled for future use and the mode of operation of the transaction card 104 is switched to the regular transaction mode.

In another embodiment, by default, the transaction card 104 may operate in the safe transaction mode. For example, the user 102 may use the service application 210 running on the user device 106 to set the safe transaction mode as default. When the safe transaction mode is set as default, the user 102 is required to unlock one of the plurality of proxy datasets $PD_1$-$PD_n$ that is unused for performing a secure card-based transaction. After the lapse of the limited time-period or the use of the unlocked proxy dataset, the proxy dataset is disabled for future use and the transaction card 104 continues to operate in the safe transaction mode.

In another embodiment, the transaction request may have a special set of data elements that is reserved for storing a proxy dataset. In such a scenario, when the acquirer server 112 receives the transaction details and the mode indicator that is set to '1' from the terminal device 108, the acquirer server 112 may add the first proxy dataset $PD_1$ to the special set of data elements in the transaction request. The acquirer server 112 may leave those data elements that are configured to store the actual card data empty and communicate the transaction request to the payment network server 114. Upon receiving such transaction request, the payment network server 114 retrieves the actual card data from the mapping database 300 and adds the actual card data to those data elements that are configured to store the actual card data. The payment network server 114 may further remove the first proxy dataset $PD_1$ from the transaction request and communicate the transaction request having the actual card data to the issuer server 116. Further, upon receiving the transaction response from the issuer server 116, the payment network server 114 adds the first proxy dataset $PD_1$ to a set of special data elements in the transaction response, removes the actual card data from the transaction response, and communicates the transaction response having the first proxy dataset $PD_1$ instead of the actual card data to the terminal device 108.

It will be apparent to a person of ordinary skill in the art that the payment network server 114 may process a secure card-based online transaction in a similar manner as described above in the foregoing without deviating from the scope of the disclosure. For an online transaction, the user device 106 may serve as a terminal device for initiating the online transaction using the unlocked first proxy dataset $PD_1$.

FIG. 6 is a block diagram that illustrates the payment network server 114, in accordance with an exemplary embodiment of the disclosure. The payment network server 114 includes second processing circuitry 602, a server memory 604, and a transceiver 606. The second processing circuitry 602, the server memory 604, and the transceiver 606 communicate with each other by way of a communication bus 608.

The second processing circuitry 602 may include suitable logic, circuitry, interfaces, and/or code, executable by the circuitry, for facilitating secure card-based transactions initiated by using the transaction card 104. Examples of the second processing circuitry 602 may include, but are not limited to, an ASIC processor, a RISC processor, a CISC processor, an FPGA, or the like. The second processing circuitry 602 may include a memory manager 610 and a transaction manager 612.

The memory manager 610 is configured to manage the server memory 604 of the payment network server 114. The memory manager 610 is configured to update the mapping database 300 stored in the server memory 604. For example, when the transaction card 104 is issued by the issuer, the memory manager 610 is configured to add the information (i.e., the mapping between the actual card data and the plurality of proxy datasets $PD_1$-$PD_n$) of the transaction card 104 in the mapping database 300. Further, the memory manager 610 is configured to update the current status of the plurality of proxy datasets $PD_1$-$PD_n$ in the mapping database 300. When the first proxy dataset $PD_1$ is detected to be present in the transaction request, the memory manager 610 is configured to access and look-up the mapping database 300 to retrieve the actual card data of the transaction card 104 that is mapped to the first proxy dataset $PD_1$.

The transaction manager 612 is configured to detect the presence of the first proxy dataset $PD_1$ in the transaction request received by the payment network server 114. The transaction manager 612 is configured to detect the presence based on a value of the mode indicator included in the transaction request. When the mode indicator indicates that the transaction is initiated by the use of the transaction card 104 in the safe transaction mode, the transaction manager 612 may replace the detected first proxy dataset $PD_1$ in the received transaction request with the actual card data retrieved by the memory manager 610. Likewise, the transaction manager 612 may further replace the actual card data in the received transaction response with the first proxy dataset $PD_1$ retrieved by the memory manager 610. The transaction manager 612 is further configured to identify the issuer that is associated with the transaction based on the actual card data of the transaction card 104. In one embodiment, the transaction manager 612 may be further configured to host the service application 210 that is executable on the user device 106 and used for activating the safe transaction mode on the transaction card 104.

The server memory 604 may include suitable logic, circuitry, interfaces, and/or codes, executable by the circuitry, for storing the mapping database 300. The server memory 604 further stores the transaction history database (hereinafter, referred to and designated as "the transaction history database 614") for maintaining a record of the transactions that correspond to the payment network server 114. The transaction history database 614 is updated by the memory manager 610 to include the transaction details of the transactions. The transaction history database 614 may be utilized by the payment network server 114 for handling post-transaction issues related to the transactions. For example, the merchant may initiate a reversal of a transaction that was initiated using the transaction card 104 operating in the safe transaction mode. Since the merchant is not exposed to the actual card data of the transaction card 104 during the safe transaction mode, the merchant may utilize the first proxy dataset $PD_1$ included in the transaction request for initiating the reversal. The transaction manager 612 may then utilize the transaction history database 614 for identifying the transaction and handling the reversal in conjunction with the issuer server 116. Examples of the server memory 604 may include, but are not limited to, a random-access memory (RAM), a read-only memory (ROM), a removable storage drive, a hard-disk drive (HDD), a flash memory, a solid-state memory, or the like. It will be apparent to a person of ordinary skill in the art that the scope of the disclosure is not limited to realizing the server memory 604 in the payment network server 114, as described herein. In another embodiment, the server memory 604 may be realized in form of a database server or a cloud storage working in conjunction with the payment network server 114, without departing from the scope of the disclosure.

The transceiver 606 may include suitable logic, circuitry, interfaces and/or code, executable by the circuitry, for transmitting and receiving data over the communication network 118 using one or more communication protocols. The transceiver 606 receives various transaction requests and messages from the acquirer server 112, and transaction responses and messages from the issuer server 116. The transceiver 606 further transmits various transaction requests and messages to the issuer server 116, and transaction responses and messages to the acquirer server 112. Examples of the transceiver 606 may include, but are not limited to, an antenna, a radio frequency transceiver, a wireless transceiver, a Bluetooth transceiver, an Ethernet port, a universal serial bus (USB) port, or any other device configured to transmit and receive data.

Figure 7:
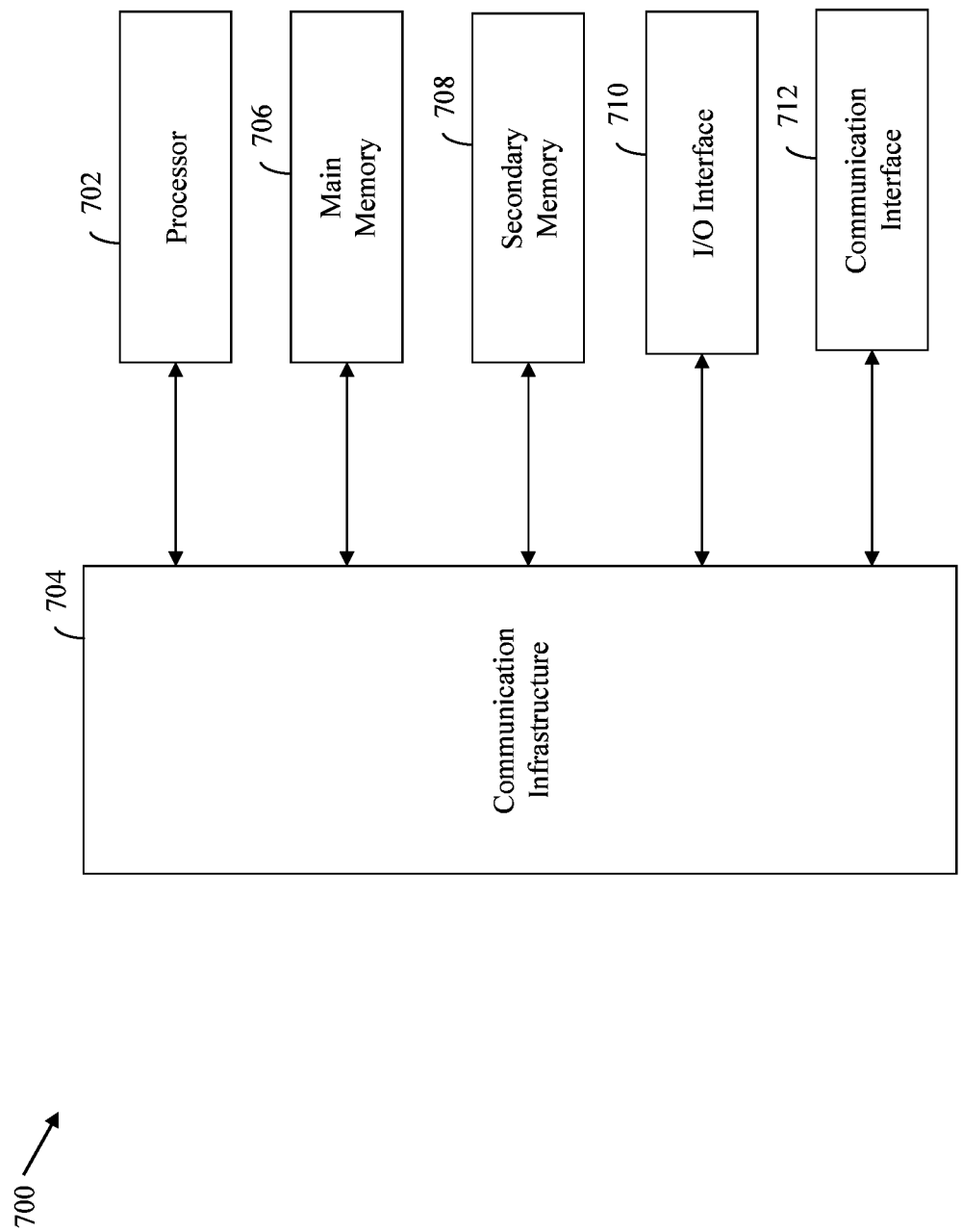
FIG. 7 is a block diagram that illustrates a system architecture of a computer system, in accordance with an exemplary embodiment of the disclosure.

FIG. 7 is a block diagram that illustrates a system architecture of a computer system 700, in accordance with an exemplary embodiment of the disclosure. An embodiment of disclosure, or portions thereof, may be implemented as computer readable code on the computer system 700. In one example, the user device 106, the terminal device 108, the merchant server 110, the acquirer server 112, and the issuer server 116 may be implemented as the computer system 700.

Hardware, software, or any combination thereof may embody modules and components used to implement methods of FIGS. 8, 9A and 9B, and 10. The computer system 700 includes a processor 702 that may be a special-purpose or a general-purpose processing device. The processor 702 may be a single processor, multiple processors, or combinations thereof. Further, the processor 702 may be connected to a communication infrastructure 704, such as a bus, message queue, multi-core message-passing scheme, and the like. The computer system 700 may further include a main memory 706 and a secondary memory 708. Examples of the main memory 706 may include a RAM, a ROM, and the like. The secondary memory 708 may include an HDD or a removable storage drive, such as a floppy disk drive, a magnetic tape drive, a compact disc, an optical disk drive, a flash memory, and the like.

The computer system 700 further includes an input/output (I/O) interface 710 and a communication interface 712. The I/O interface 710 includes various input and output devices that are configured to communicate with the processor 702. Examples of the input devices may include a keyboard, a mouse, a joystick, a touchscreen, a microphone, and the like. Examples of the output devices may include a display screen, a speaker, headphones, and the like. The communication interface 712 may be configured to allow data to be transferred between the computer system 700 and various devices that are communicatively coupled to the computer system 700. Examples of the communication interface 712 may include a modem, a network interface, i.e., an Ethernet card, a communications port, and the like. Data transferred via the communication interface 712 may correspond to signals, such as electronic, electromagnetic, optical, or other signals as will be apparent to a person skilled in the art.

FIG. 8 is a flow chart 800 that illustrates a method for activating the safe transaction mode of the transaction card 104, in accordance with an exemplary embodiment of the disclosure.

At step 802, the transaction card memory 202 stores therein the actual card data and the plurality of proxy datasets $PD_1$-$PD_n$ of the transaction card 104. The transaction card 104 is capable of operating in one of the regular transaction mode and the safe transaction mode. For performing a secure card-based transaction using the transaction card 104, the user 102 may utilize the service application 210 running on the user device 106 to activate the safe transaction mode of the transaction card 104. The user 102 may select the safe transaction option presented by the service application 210 to request for the safe transaction mode.

At step 804, the transaction card 104 receives the unlock request from the user device 106. The transaction card 104 receives the unlock request when the transaction card 104 is communicatively paired (i.e., in communication) with the user device 106 via the NFC channel 208 and the user 102 selects the safe transaction option through the service application 210. At step 806, based on the unlock request, the first processing circuitry 206 unlocks one of the plurality of proxy datasets $PD_1$-$PD_n$ (e.g., the first proxy dataset $PD_1$) stored in the second memory block 202b. At step 808, the first processing circuitry 206 activates the safe transaction mode of the transaction card 104. In the safe transaction mode, the unlocked proxy dataset (i.e., the first proxy dataset $PD_1$) in the second memory block 202b is enabled for read operation and the first memory block 202a is disabled for any read-write operation. Upon the activation of the safe transaction mode, an unlock response is communicated to the user device 106 by the transaction card 104 through the NFC channel 208.

At step 810, the first processing circuitry 206 communicates, instead of the actual card data, the unlocked first proxy dataset $PD_1$ and the mode indicator to the terminal device 108 based on the initiation of the transaction at the terminal device 108 by use of the transaction card 104. At step 812, the first processing circuitry 206 permanently disables the unlocked first proxy dataset $PD_1$ for any future use upon use or the expiry of the limited time-period.

Figure 9A:
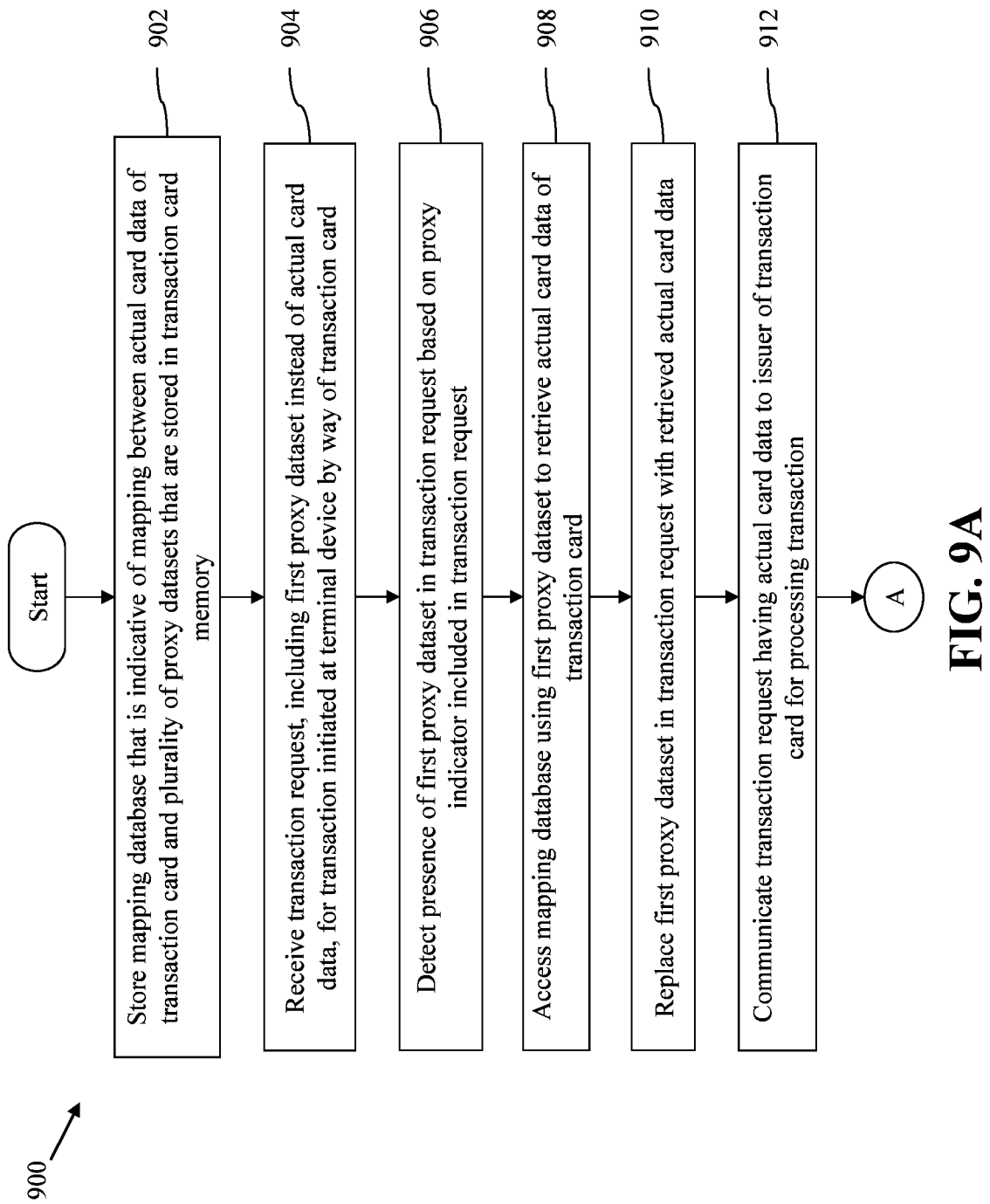

FIGS. 9A and 9B, collectively represent a flow chart 900 that illustrates a method for facilitating secure card-based transactions, in accordance with an exemplary embodiment of the disclosure.

With reference to FIG. 9A, at step 902, the payment network server 114 stores the mapping database 300 in the server memory 604. The mapping database 300 is indicative of the mapping between the actual card data of the transaction card 104 and the plurality of proxy datasets $PD_1$-$PD_n$ that are stored in the transaction card memory 202 of the transaction card 104. The user 102 may use the transaction card 104 that is operating in the safe transaction mode to initiate a secure card-based transaction at the terminal device 108.

At step 904, the payment network server 114 receives a transaction request for the transaction initiated at the terminal device 108. The transaction request includes, instead of the actual card data, the unlocked first proxy dataset $PD_1$ as an identifier to the transaction card 104. The transaction request further includes the mode indicator that indicates that the transaction card 104 is currently operating in the safe transaction mode. At step 906, based on the mode indicator included in the transaction request, the payment network server 114 detects the presence of a proxy dataset (i.e., the first proxy dataset $PD_1$) in the transaction request. For example, when the mode indicator is set to a value '1', the payment network server 114 determines that the transaction card 104 is operating in the safe transaction mode and detects the presence of the first proxy dataset $PD_1$ in the transaction request. However, when the mode indicator is set to a value '0', the payment network server 114 determines that the transaction card 104 is operating in the regular transaction mode and no proxy dataset is included in the transaction request.

At step 908, the payment network server 114 accesses the mapping database 300 by using the first proxy dataset $PD_1$ in the transaction request. From the mapping database 300, the payment network server 114 retrieves the actual card data of the transaction card that is mapped to the first proxy dataset $PD_1$. At step 910, the payment network server 114 replaces the first proxy dataset $PD_1$ in the transaction request with the retrieved actual card data. At step 912, the payment network server 114 communicates the transaction request having the actual card data to the issuer (i.e., the issuer server 116) of the transaction card 104 for processing the transaction. The issuer server 116 processes the transaction and generates the transaction response to indicate the result of the processing of the transaction. The transaction response includes the actual card data of the transaction card 104.

With reference to FIG. 9B, at step 914, the payment network server 114 receives from the issuer server 116, the transaction response that is indicative of the result of processing of the transaction and includes the actual card data of the transaction card 104. At step 916, the payment network server 114 accesses the mapping database 300 using the actual card data to retrieve the first proxy dataset $PD_1$ that was used in the transaction request. At step 918, the payment network server 114 replaces the actual card data in the transaction response with the first proxy dataset $PD_1$. At step 920, the payment network server 114 communicates the transaction response having the first proxy dataset $PD_1$, instead of the actual card data, to the terminal device 108 to notify the result of the processing of the transaction.

Figure 10:
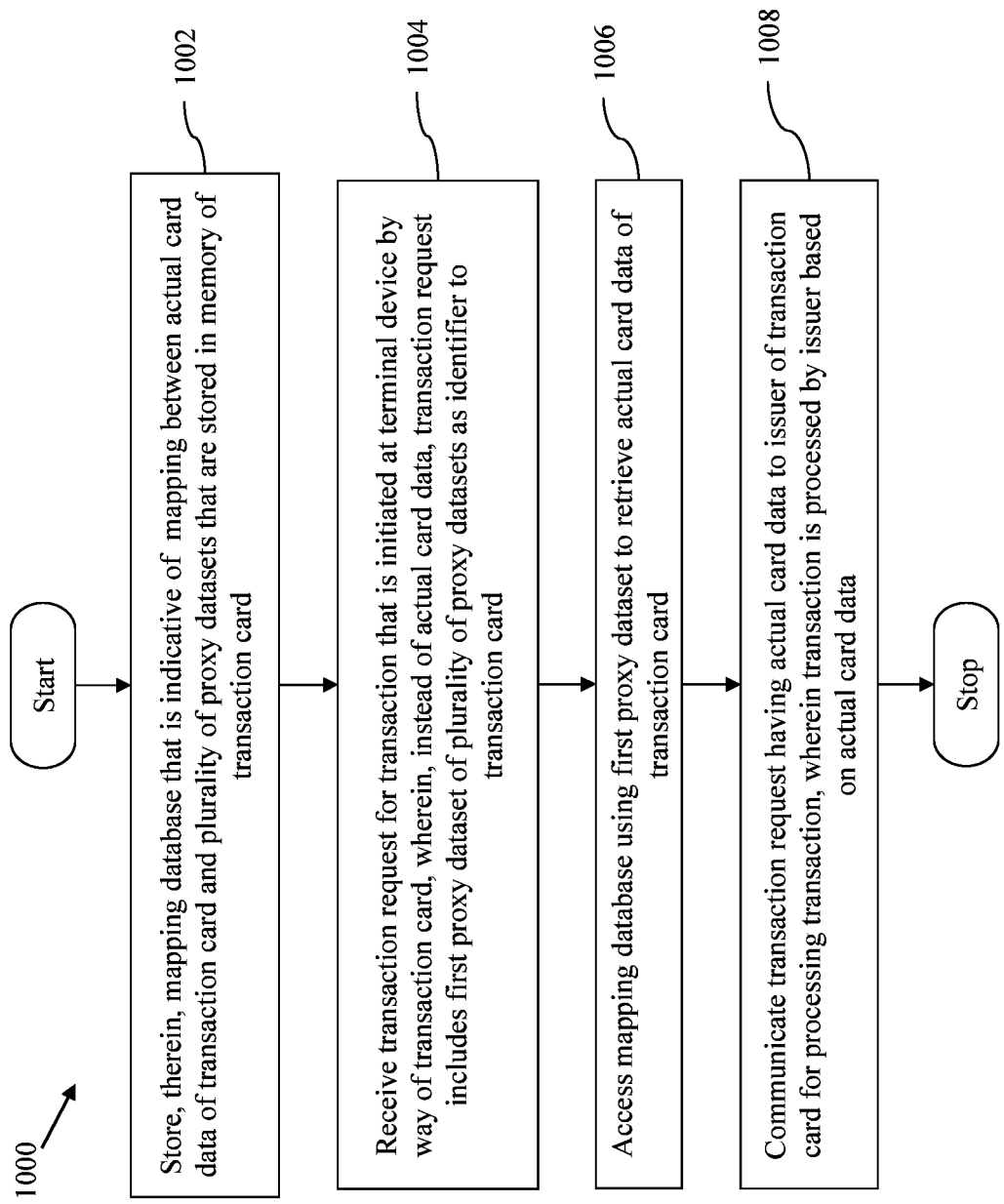
FIG. 10 is a high-level flow chart that illustrates a method for facilitating secure card-based transactions, in accordance with an exemplary embodiment of the disclosure.

FIG. 10 represents a high-level flow chart 1000 that illustrates a method for facilitating secure card-based transactions, in accordance with an exemplary embodiment of the disclosure. At step 1002, the payment network server 114 stores therein, the mapping database 300 that is indicative of the mapping between the actual card data of the transaction card 104 and the plurality of proxy datasets $PD_1$-$PD_n$ that are stored in the transaction card memory 202 of the transaction card 104. At step 1004, the payment network server 114 receives a transaction request for the transaction that is initiated at the terminal device 108 by way of the transaction card 104. The transaction request includes, instead of the actual card data, the unlocked first proxy dataset $PD_1$ as an identifier to the transaction card 104. At step 1006, the payment network server 114 accesses the mapping database 300 using the first proxy dataset $PD_1$ to retrieve the actual card data of the transaction card. At step 1008, the payment network server 114 communicates the transaction request including the actual card data to the issuer (i.e., the issuer server 116) of the transaction card 104 for processing the transaction. The issuer server 116 processes the transaction based on the actual card data.

Thus, technological improvements in the payment network server 114 and the transaction card 104 enable the user 102 to perform secure card-based transactions at the terminal device 108. When the transaction card 104 is operating in the safe transaction mode, the actual card data of the transaction card 104 is rendered inaccessible to the terminal device 108. Hence, the actual card data of the transaction card 104 is not exposed to the merchant server 110 associated with the terminal device 108. Thus, the fraudulent transactions occurring at the terminal device 108 for which the cost is mostly borne by issuers are reduced. Since the payment network server 114 maintains the mapping database 300, there is no requirement for the issuer server 116 to maintain such database. Thus, the embodiments in the disclosure does not require any hardware or infrastructure upgrades at the issuer level for processing the transactions.

A person having ordinary skill in the art will appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into digitally any device. Further, the operations may be described as a sequential process, however some of the operations may in fact be performed in parallel, concurrently, and/or in a distributed environment by single or multiprocessor machines. In addition, in some embodiments the order of operations may be rearranged without departing from the spirit of the disclosed subject matter.

Techniques consistent with the present disclosure provide, among other features, systems and methods for facilitating secure card-based transactions. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

Unless stated otherwise, terms such as "first" and "second" in claims are used to arbitrarily distinguish between the elements such terms describe. Thus, these terms are not necessarily intended to indicate temporal or other prioritization of such elements. The fact that certain measures are recited in mutually different claims does not indicate that a combination of these measures cannot be used to advantage. While various embodiments of the disclosure have been illustrated and described, it will be clear that the disclosure is not limited to these embodiments only. Numerous modifications, changes, variations, substitutions, and equivalents will be apparent to those skilled in the art, without departing from the spirit and scope of the disclosure, as described in the claims.

We claim:

1. A method for facilitating secure card-based transactions, the method comprising:
    storing, by a payment network server therein, a mapping database that is indicative of a mapping between actual card data of a transaction card and a plurality of proxy datasets that are stored in a memory of the transaction card;
    receiving, by the payment network server, a transaction request for a transaction that is initiated at a terminal device by way of the transaction card,
    wherein the transaction request includes a first proxy dataset of the plurality of proxy datasets as an identifier to the transaction card and a mode indicator that indicates a presence of the first proxy dataset in the transaction request, the mode indicator providing an indication of one of a safe transaction mode and a regular transaction mode,
    wherein each of the plurality of proxy datasets is different from remaining proxy datasets of the plurality of proxy datasets, configured for one-time use, and includes a proxy transaction card number, a proxy card verification value, and a proxy expiry date linked to the transaction card; and
    wherein, prior to the initiation of the transaction, the first proxy dataset is unlocked in the memory of the transaction card based on a communication between the transaction card and a user device of a user of the transaction card;
    accessing, by the payment network server, the mapping database using the first proxy dataset to retrieve the actual card data of the transaction card;
    communicating, by the payment network server, the transaction request having the actual card data to an issuer of the transaction card for processing the transaction, wherein the transaction is processed by the issuer based on the actual card data;
    receiving, by the payment network server from the issuer, a transaction response that is indicative of a result of the processing of the transaction, wherein the transaction response includes the actual card data of the transaction card;
    accessing, by the payment network server, the mapping database using the actual card data to retrieve the first proxy dataset of the transaction card; and
    communicating, by the payment network server to the terminal device, the transaction response having the first proxy dataset, instead of the actual card data, to notify the result of the processing of the transaction.

2. The method of claim 1, wherein the actual card data includes an actual transaction card number, an actual card verification value, and an actual expiry date of the transaction card.

3. The method of claim 1, wherein, after the initiation of the transaction, the first proxy dataset expires and is permanently disabled for use.

4. The method of claim 1, wherein the actual card data of the transaction card is rendered inaccessible to the terminal device.

5. The method of claim 1, further comprising detecting, by the payment network server, the presence of the first proxy dataset in the transaction request based on the mode indicator prior to accessing the mapping database.

6. A system for facilitating secure card-based transactions, the system comprising:
    a payment network server comprising:
        a first memory configured to store a mapping database that is indicative of a mapping between actual card data of a transaction card and a plurality of proxy datasets that are stored in a second memory of the transaction card; and
        processing circuitry configured to:
            receive a transaction request for a transaction initiated at a terminal device by way of the transaction card, wherein, instead of the actual card data, the transaction request includes a first proxy dataset of the plurality of proxy datasets as an identifier to the transaction card and a mode indicator that indicates a presence of the first proxy dataset in the transaction request, the mode indicator providing an indication of one of a safe transaction mode and a regular transaction mode, wherein each of the plurality of proxy datasets is different from remaining proxy datasets of the plurality of proxy datasets, configured for one-time use, and includes a proxy transaction card number, a proxy card verification value, and a proxy expiry date linked to the transaction card, and wherein, prior to the initiation of the transaction, the first proxy dataset is unlocked in the second memory of the transaction card based on a communication between the transaction card and a user device of a user of the transaction card;

access the mapping database stored in the first memory using the first proxy dataset to retrieve the actual card data of the transaction card;

communicate the transaction request having the actual card data to an issuer of the transaction card for processing the transaction, wherein the transaction is processed by the issuer based on the actual card data;

receive a transaction response that is indicative of a result of the processing of the transaction, wherein the transaction response includes the actual card data of the transaction card;

access the mapping database using the actual card data to retrieve the first proxy dataset of the transaction card; and communicate the transaction response having the first proxy dataset, instead of the actual card data, to notify the result of the processing of the transaction.

7. The system of claim 6, wherein the actual card data includes an actual transaction card number, an actual card verification value, and an actual expiry date of the transaction card.

8. The system of claim 6, wherein, after the initiation of the transaction, the first proxy dataset expires and is permanently disabled for use.

9. The system of claim 6, wherein the processing circuitry is further configured to detect the presence of the first proxy dataset in the transaction request based on the mode indicator prior to accessing the mapping database.

10. The system of claim 6, wherein the actual card data of the transaction card is rendered inaccessible to the terminal device.

11. A transaction card for facilitating secure card-based transactions, the transaction card comprising:

a memory configured to store actual card data and a plurality of proxy datasets of the transaction card; and processing circuitry configured to:

receive an unlock request from a user device of a user of the transaction card;

unlock a first proxy dataset from the plurality of proxy datasets based on the unlock request; and communicate the unlocked first proxy dataset to a terminal device based on an initiation of a transaction at the terminal device by way of the transaction card, wherein:

the unlocked first proxy dataset and a mode indicator that indicates a presence of the first proxy dataset in the transaction request is included as an identifier to the transaction card in a transaction request for the transaction, the mode indicator providing an indication of one of a safe transaction mode and a regular transaction mode;

the first proxy dataset is configured for one-time use and includes a proxy transaction card number, a proxy card verification value, and a proxy expiry date linked to the transaction card, wherein, after the initiation of the transaction, the first proxy dataset expires and is permanently disabled for use;

at a payment network server, the actual card data of the transaction card is retrieved based on the first proxy dataset;

the transaction request having the actual card data is communicated to an issuer of the transaction card for processing the transaction;

a transaction response is received by the payment network server that is indicative of a result of the processing of the transaction, wherein the transaction response includes the actual card data of the transaction card;

a mapping database is accessed using the actual card data to retrieve the first proxy dataset of the transaction card; and the transaction response having the first proxy dataset is communicated, instead of the actual card data, to notify the result of the processing of the transaction.

12. The transaction card of claim 11, wherein the memory comprising:

a first memory block configured to store the actual card data; and a second memory block configured to store the plurality of proxy datasets, wherein the processing circuitry is further configured to:

restrict the terminal device from accessing the first memory block based on the unlocking of the first proxy dataset.

13. The transaction card of claim 11, wherein the actual card data includes an actual transaction card number, an actual card verification value, and an actual expiry date of the transaction.

14. The transaction card of claim 11, wherein each proxy dataset of the plurality of proxy is configured for one-time use and is different from remaining proxy datasets of the plurality of proxy datasets.

* * * * *